United States Patent
Kimura

(10) Patent No.: US 10,540,791 B2
(45) Date of Patent: Jan. 21, 2020

(54) IMAGE PROCESSING APPARATUS, AND IMAGE PROCESSING METHOD FOR PERFORMING SCALING PROCESSING BASED ON IMAGE CHARACTERISTICS

(71) Applicant: SONY CORPORATION, Tokyo (JP)

(72) Inventor: Seiji Kimura, Chiba (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 14/198,690

(22) Filed: Mar. 6, 2014

(65) Prior Publication Data
US 2014/0320534 A1    Oct. 30, 2014

(30) Foreign Application Priority Data

Apr. 30, 2013    (JP) .................... 2013-095887

(51) Int. Cl.
*G06T 11/60*    (2006.01)
(52) U.S. Cl.
CPC .................... *G06T 11/60* (2013.01)
(58) Field of Classification Search
None
See application file for complete search history.

(56) References Cited

U.S. PATENT DOCUMENTS

| | | | |
|---|---|---|---|
| 6,346,950 B1 * | 2/2002 | Jouppi ................ | G05D 1/0246 345/660 |
| 7,327,890 B2 * | 2/2008 | Fredlund .................... | 382/218 |
| 2003/0025812 A1 * | 2/2003 | Slatter ...................... | 348/240.2 |
| 2004/0239950 A1 * | 12/2004 | Mahon .................. | G01B 11/24 356/606 |
| 2005/0058322 A1 * | 3/2005 | Farmer et al. ............... | 382/103 |
| 2006/0126082 A1 * | 6/2006 | Choi ................... | H04N 1/2112 358/1.2 |

(Continued)

FOREIGN PATENT DOCUMENTS

| | | |
|---|---|---|
| CN | 101137034 A | 3/2008 |
| CN | 102143371 A | 8/2011 |

(Continued)

OTHER PUBLICATIONS

Image Borders, NI Vision 2011 Concepts Help, Jun. 2011.*

(Continued)

*Primary Examiner* — Jason A Pringle-Parker
(74) *Attorney, Agent, or Firm* — Paratus Law Group, PLLC

(57) ABSTRACT

There is provided an image processing apparatus that includes a center generation section, a periphery generation section, and an image combination section. The center generation section is configured to generate an image of a central part on a screen by performing scaling processing on an image based on characteristics thereof. The periphery generation section is configured to generate an image of a peripheral part by extrapolation of the image of the central part, the peripheral part being a part peripheral to the central part on the screen. The image combination section is configured to generate a combined image by combining the image of the central part and the image of the peripheral part, the image of the central part being generated by the center generation section, the image of the peripheral part being generated by the periphery generation section.

24 Claims, 44 Drawing Sheets

(56) References Cited

U.S. PATENT DOCUMENTS

| | | | |
|---|---|---|---|
| 2008/0174699 A1 | 7/2008 | Suzuki et al. | |
| 2008/0240250 A1* | 10/2008 | Lin | H04N 19/147 375/240.18 |
| 2008/0292151 A1* | 11/2008 | Kurtz | A61B 3/10 382/128 |
| 2011/0181593 A1 | 7/2011 | Hirai et al. | |
| 2013/0055087 A1* | 2/2013 | Flint | G11B 27/034 715/723 |
| 2013/0063625 A1* | 3/2013 | Yamanaka | G06K 9/36 348/239 |
| 2013/0342640 A1* | 12/2013 | Li et al. | 348/14.13 |
| 2014/0184626 A1* | 7/2014 | Narayanan | G06T 1/60 345/545 |
| 2014/0341476 A1* | 11/2014 | Kulick | G06K 9/6267 382/224 |
| 2015/0036051 A1* | 2/2015 | Broberg | H04N 5/91 348/571 |

FOREIGN PATENT DOCUMENTS

| | | | |
|---|---|---|---|
| JP | 2007-264456 | 10/2007 | |
| JP | 2008-233765 | 10/2008 | |
| JP | 2008-242048 | 10/2008 | |
| JP | 2009-162899 | 7/2009 | |
| WO | WO 2007001298 A1 * | 1/2007 | ............ G09G 5/14 |
| WO | WO/2012/139275 * | 11/2011 | |
| WO | WO 2012/139275 A1 | 10/2012 | |

OTHER PUBLICATIONS

Beginning OpenGL Game Programming by Dave Astle and Kevin Hawkins, 2004, p. 169.*

Shai Avidan, et al., Seam Carving for Content-Aware Image Resizing, ACM Transactions on Graphics, Jul. 2007, vol. 26, No. 3, Article 10, ACM Publications, New York, NY.

Amit Aides, et al. Multiscale Ultrawide Foveated Video Extrapolation, 2011, IEEE.

Jul. 27, 2017, CN communication issued for related CN application No. 201410166630.6.

Jun. 29, 2018, Chinese Office Action issued for related CN Application No. 201410166630.6.

* cited by examiner

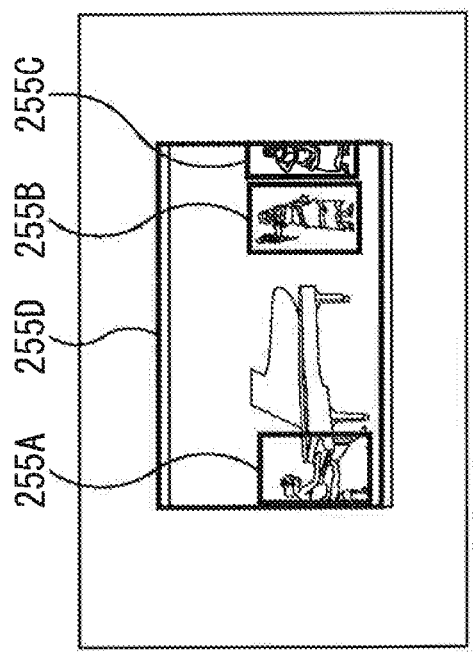
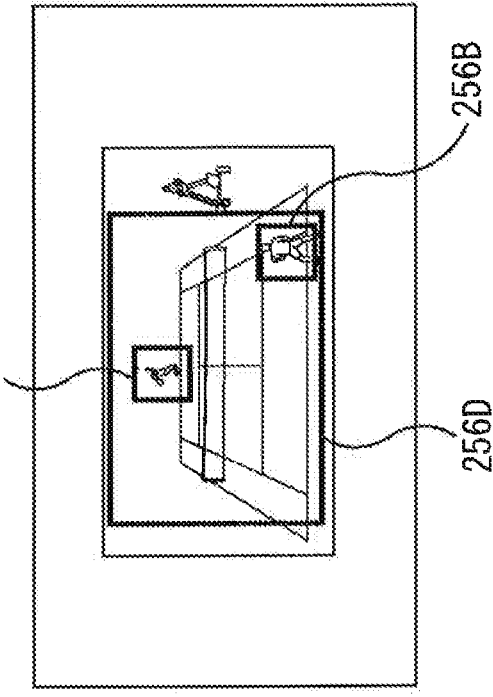
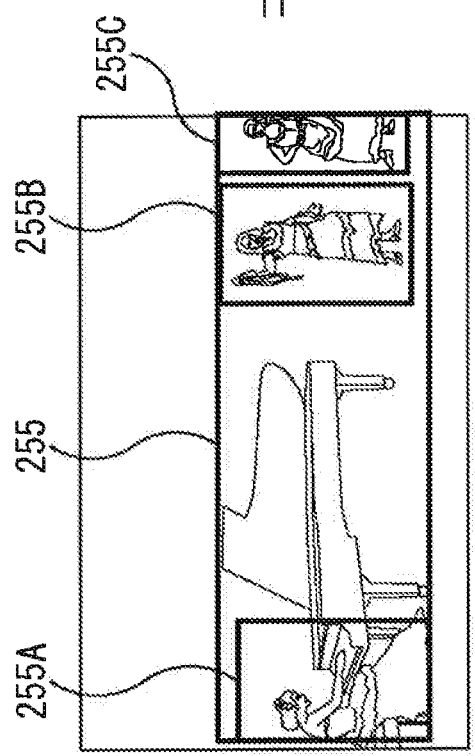
FIG.27A
FIG.27B

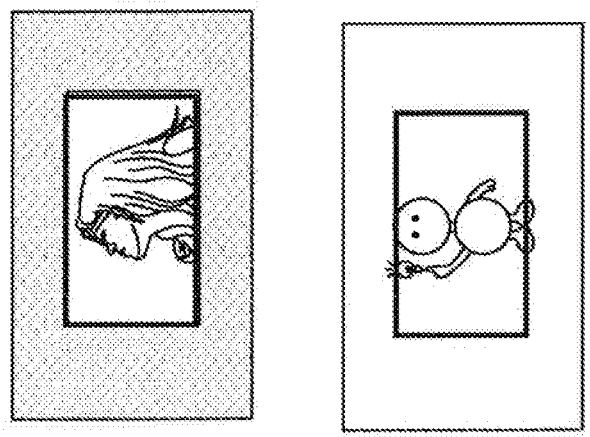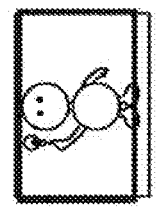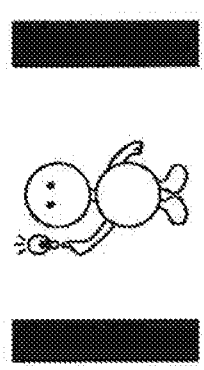
FIG.42A
FIG.42B

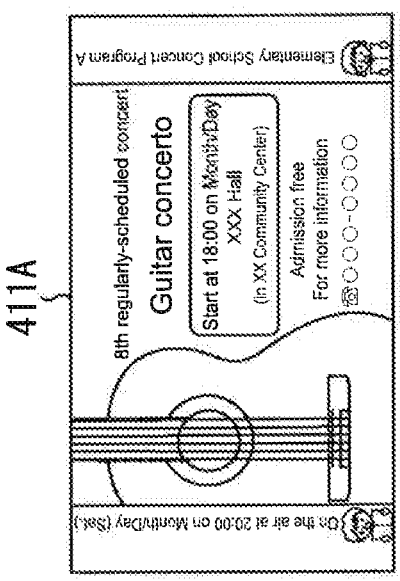
FIG.43A
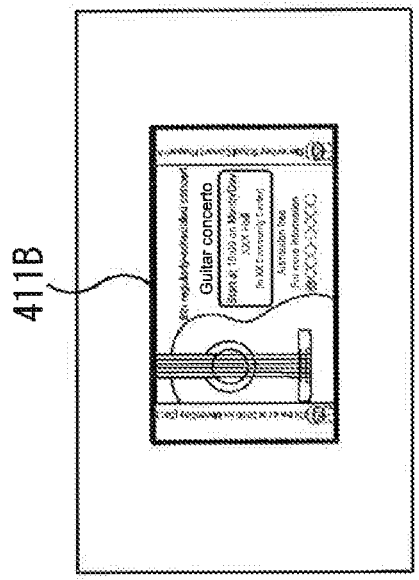
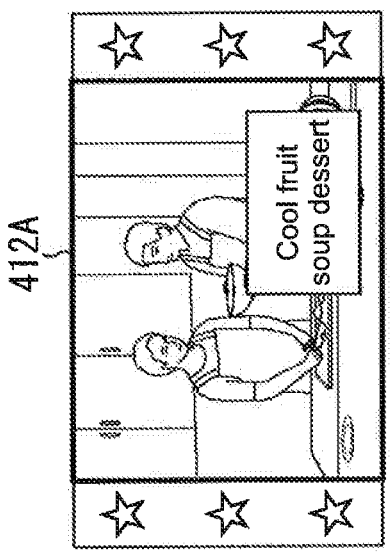
FIG.43B
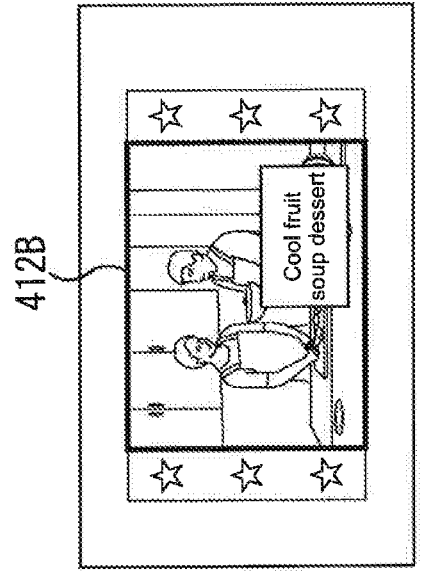

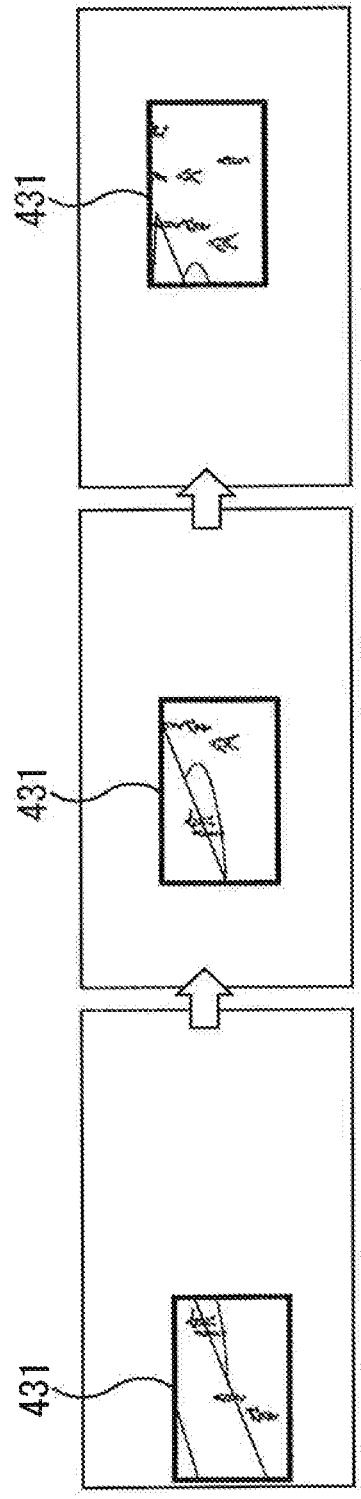

| Control index | Control information | How to define central part | Scale factor | Effect | Visual effect | | |
|---|---|---|---|---|---|---|---|
| | | | | | Sense of realism (Immersive experience) | Realistic effects | Viewability |
| Band distribution | Header information of stream | Determine size of central part based on band distribution, i.e., the band distribution being on the lower side, the smaller the central part is | With band distribution being on lower side, the scale factor is lower than that for full scaling | Prevent image from getting more blurred | | O | |
| Amount of compressive strain | Bit rate information and decoding information of stream | Determine size of central part based on amount of compressive strain, i.e., the larger the amount of compressive strain, the smaller the central part is | With the amount of compressive strain being larger, the scale factor is lower than that for full scaling | Make compressive strain not noticeable | | O | |
| Amount of noise | Information about camera used for imaging | Determine size of central part based on amount of noise, i.e., the larger the amount of noise, the smaller the central part is | With the amount of noise being larger, the scale factor is lower than that for full scaling | Make noise not noticeable | | O | |
| Quantization step size | Information in stream | Determine size of central part based on quantization step size, i.e., the larger the quantization step size, the smaller the central part is | With the quantization step size being larger, the scale factor is lower than that for full scaling | Make poor image quality not noticeable | | O | |
| Subtitle part | OSD information | Determine size of central part to include subtitle part within central field of view | The scale factor is basically lower than that for full scaling | Prevent viewability of subtitles from being impaired | | | O |
| Face part | | Determine size of central part to include face part within central field of view | The scale factor is basically lower than that for full scaling | Prevent viewability of face from being impaired, and prevent viewer from feeling oppressed | | O | O |
| Human part | | Determine size of central part to include human part within central field of view. Move central part to include part of specific person in the vicinity of center of central part | The scale factor is basically lower than that for full scaling | Prevent viewability of human from being impaired | | | O |
| Object part | Viewer's designation | Define size of central part to include object part within central field of view | The scale factor is basically lower than that for full scaling | Prevent viewability of main object from being impaired | | | O |
| Program genre information | EPG | Estimate high-significance-level part based on program genre, and determine size of central part to include high-significance-level part within central field of view | The scale factor is basically lower than that for full scaling | Improve viewability | | | O |
| Scene | | Determine size of central part based on level of wide-angle suitability of scenes, i.e., the central part is increased in size for scene with higher level of wide-angle suitability | With scene more suitable for wide-angle display, the scale factor is close to that for full scaling | Generate wide-view image satisfying intention of person who capture images | O | | |
| Focal length, aperture (F value), distance-measurement information, lens type | Imaging information | Estimate level of wide-angle suitability based on focal length, aperture (F value), distance-measurement information, lens type, and others, and determine size of central part based thereon, i.e., the central part is increased in size with higher level of wide-angle suitability | With higher level of wide-angle suitability, the scale factor is close to that for full scaling | Generate wide-view image satisfying intention of person who capture images | O | | |
| Composition | | Determine size of central part based on composition, i.e., to include part allowing perception of entire composition within central field of view | With centered composition, the scale factor is that of full scaling, and with other compositions, the scale factor is basically lower than that for full scaling | Generate wide-view image satisfying intention of person who capture images | O | | |
| | | Move center of central part based on composition (black image is disposed to the part left vacant thereby) | The scale factor is lower than that for full scaling | Generate wide-view image satisfying intention of person who capture images | O | | |
| Real size of object | Meta information | Define central part to have object in real size | The scale factor is basically lower than that for full scaling | With object(s) in real size, viewer feel like they are actually in front of him | O | O | |
| Black bar | | Define central part with input image not including black-bar part | | Improve viewability of effective part | | | O |
| Sidebar | | When sidebars include characters, define central part to include entire part within central field of view, and when sidebars are artificial images, define central part to include remaining no-sidebar part within central field of view | The scale factor is basically lower than that for full scaling | Improve viewability of effective part | | | O |
| Motion vector | Decoding information of stream | Estimate which technique is used for imaging based on motion vector, i.e., panning technique or zoom-in technique, move central part in image captured with panning technique based on motion vector, and define central part in image captured with zoom-in technique not to change object size (at this time, peripheral part is gradually reduced in brightness, or is more blurred) | The scale factor is basically lower than that for full scaling with image captured with panning technique, and at the time of imaging with zoom-in technique, the scale factor is gradually reduced | Generate wide-view image satisfying intention of person who capture images | O | | |
| | | Define central part based on motion vector, i.e., the larger the motion vector, the smaller the central part is | With motion vector being larger, the scale factor is lower than that for full scaling | Protect viewer from visually induced motion sickness | | | O |

FIG.46

IMAGE PROCESSING APPARATUS, AND IMAGE PROCESSING METHOD FOR PERFORMING SCALING PROCESSING BASED ON IMAGE CHARACTERISTICS

CROSS REFERENCE TO RELATED APPLICATIONS

This application claims the benefit of Japanese Priority Patent Application JP 2013-095887 filed Apr. 30, 2013, the entire contents of which are incorporated herein by reference.

BACKGROUND

The present disclosure relates to image processing apparatuses and methods, and more specifically, to an image processing apparatus and method of generating a wide-view image considering characteristics of an input image.

A flat panel display has recently been increasing in size. When a visual range is fixed, a larger flat panel display leads to a better sense of realism (immersive experience) with viewing of wide-view images. In this Specification, the expression of "a sense of realism" means a viewer's feeling like actually being in the world represented by images on the display.

A display with a high resolution such as 4K and 8K is now about to be available for practical use. The higher resolution of a display allows representation of images that look close to real, and leads to better realistic effects. In this Specification, the expression of "realistic effects" means a viewer's feeling as if the object of an image he/she is looking actually exists.

For displaying images on a high-resolution large-sized display, the images are often displayed with a resolution lower than that of the display, e.g., when the resolution of a display is 4K, images are often displayed with a resolution of 2K.

If this is the case, the resolution of the display images is up-converted to that of the display using linear scaling techniques adopted in the display, e.g., superresolution techniques. The images are then displayed as wide-view images.

The concern here is that when an image is scaled up uniformly over the screen by the linear scaling techniques, the viewability is impaired because the image in the viewer's central field of view (discriminating field of view, useful field of view) looks different from that originally intended at the time of imaging. The details will be described later.

Therefore, image up-conversion using nonlinear scaling techniques is proposed to change the scale factor between the central part of the screen that is very likely to include any attention-attracting object, and the remaining part of the screen peripheral to the central part (hereinafter, referred to as peripheral part). In this Specification, the expression of "viewability" means the easy-to-view degree of the images, and the easy-to-understand degree of the contents of the images.

The nonlinear scaling techniques include a technique of performing scaling on the central part of the screen and the peripheral part thereof using various scale factors. With this technique, the scale factors are defined differently for the central part of the screen and the peripheral part thereof based on a visual range, for example. As an example, refer to Japanese Patent Application Laid-open No. 2007-264456. There is another technique of performing scaling on the central part of the screen and the peripheral part thereof using various scale factors. With this technique, the scale factors are also defined differently for the central part of the screen and the peripheral part thereof but with this technique based on the motion in the entire screen. As an example, refer to Japanese Patent Application Laid-open No. 2008-242048.

There is still another technique of performing scaling on the central part of the screen and the peripheral part thereof using various scale factors. With this technique, a viewer's line of sight is detected by the movement of his eyeballs, and based on this detected line of sight, the scale factors are defined differently for the central part of the screen and the peripheral part thereof. As an example, refer to Japanese Patent Application Laid-open No. 2008-233765. There is also a technique utilizing Seam Carving. As an example, refer to "Seam Carving for Content-Aware Image Resizing", Avidan et al, SIGGRAPH 2007.

These non-linear scaling techniques, however, may cause image deformation due to the different scale factors between the central part of the screen and the peripheral part thereof.

In order to prevent such image deformation, proposed is a non-linear scaling technique with which an input image is disposed in the central part of the screen, and another image is disposed by extrapolation in the part peripheral to the central part. As an example, refer to "Multi-scale ultrawide foveated video extrapolation", A. Adies, T. Avraham, and Y. Schechner. Israel Institute of Technology In ICCP, 2011.

In order to prevent image deformation, there is another non-linear scaling technique with which an input image is disposed in the central part of the screen after resizing and/or position change thereof. In the part peripheral to the central part, an image is disposed by extrapolation around the central part. As an example, refer to Japanese Patent Application Laid-open No. 2009-162899.

SUMMARY

With the technique of "Multi-scale ultrawide foveated video extrapolation", A. Adies, T. Avraham, and Y. Schechner. Israel Institute of Technology In ICCP, 2011 and that of Japanese Patent Application Laid-open No. 2009-162899, however, characteristics of images are not taken into consideration to generate wide-view images.

It is thus desirable to generate wide-view images considering characteristics of images.

According to an embodiment of the present disclosure, there is provided an image processing apparatus that includes a center generation section, a periphery generation section, and an image combination section. The center generation section is configured to generate an image of a central part on a screen by performing scaling processing on an image based on characteristics thereof. The periphery generation section is configured to generate an image of a peripheral part by extrapolation of the image of the central part, the peripheral part being a part peripheral to the central part on the screen. The image combination section is configured to generate a combined image by combining the image of the central part and the image of the peripheral part, the image of the central part being generated by the center generation section, the image of the peripheral part being generated by the periphery generation section.

An image processing method according to an embodiment of the present disclosure corresponds to an image processing apparatus according to an embodiment of the present disclosure.

According to an embodiment of the present disclosure, an image of a central part on a screen is generated by scaling processing performed on an image based on characteristics thereof. An image of a peripheral part is then generated by extrapolation of the image of the central part thereinto, the peripheral part being a part peripheral to the central part on the screen. The image of the central part is combined with the image of the peripheral part so that a combined image is generated.

Note that an image processing apparatus according to an embodiment of the present disclosure is implemented by a computer running a program.

For implementing an image processing apparatus according to an embodiment of the present disclosure, a program for running by a computer may be distributed by transmission via a transmission medium or recording on a recording medium.

According to an embodiment of the present disclosure, a wide-view image is able to be generated considering characteristics of an image.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 27A and 27B are diagrams illustrating the effect produced by the image processing apparatus;

FIGS. 42A and 42B are diagrams illustrating image processing on an image including black bars;

FIGS. 43A and 43B are diagrams illustrating image processing on an image including sidebars;

FIGS. 44A and 44B are diagrams illustrating image processing on an image captured with the panning technique;

FIG. 46 is a diagram showing image processing according to the embodiments of the present disclosure, and the effect thereof.

DETAILED DESCRIPTION OF EMBODIMENTS

Hereinafter, embodiments of the present disclosure will be described with reference to the drawings.

First Embodiment

Exemplary Configuration of Image Processing Apparatus in First Embodiment

Figure 1:
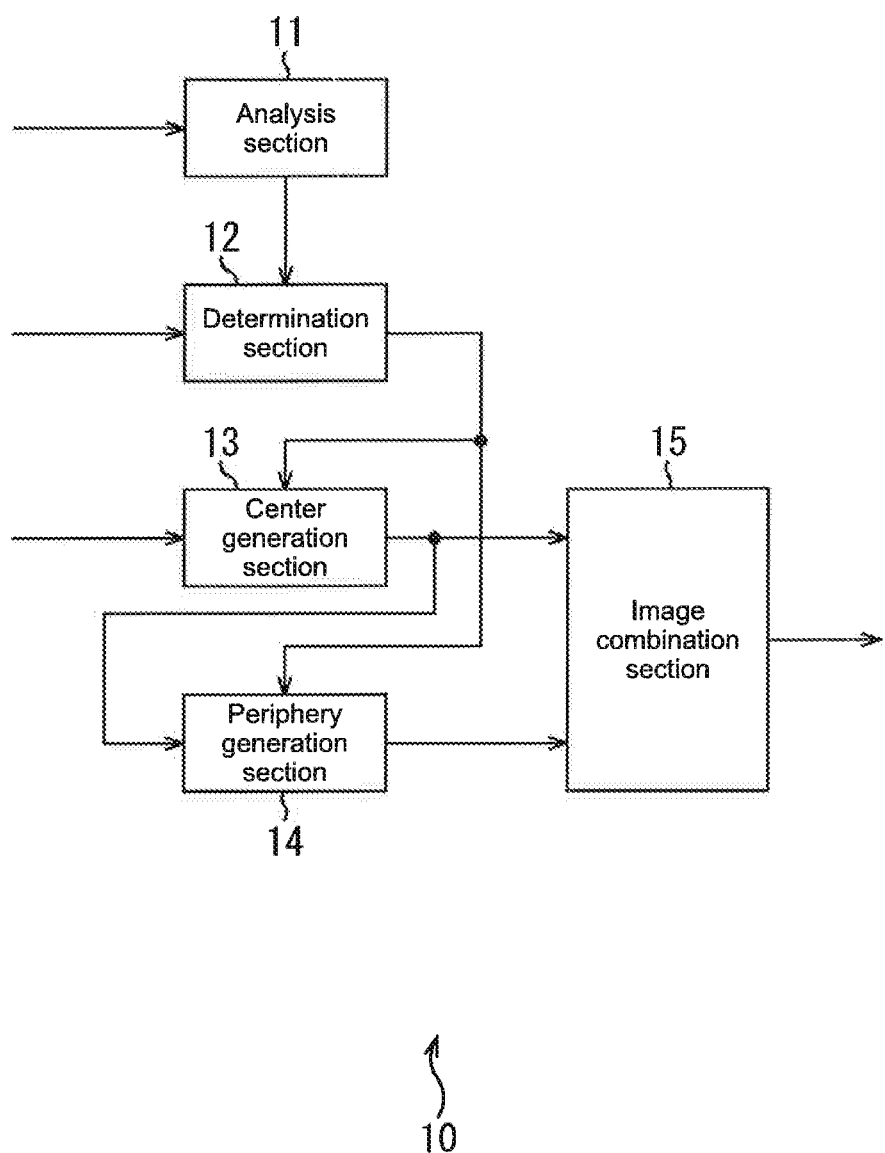
FIG. 1 is a block diagram showing an exemplary configuration of an image processing apparatus in a first embodiment with the application of the present disclosure.

FIG. 1 is a block diagram showing an exemplary configuration of an image processing apparatus in a first embodiment with the application of the present disclosure.

An image processing apparatus 10 of FIG. 1 includes an analysis section 11, a determination section 12, a center generation section 13, a periphery generation section 14, and an image combination section 15. The image processing apparatus 10 generates a wide-view image by disposing, at a central part of a screen, an input image of the size based on the characteristics thereof, i.e., image quality. The image processing apparatus 10 then disposes another image by extrapolation to a part peripheral to the central part.

To be specific, in the image processing apparatus 10, the analysis section 11 analyzes the quality of an input image based on information thereabout, and supplies an image quality signal indicating the level of the quality to the determination section 12. Herein, the input image is an image provided from the outside.

The determination section 12 determines a final image quality signal based both on the image quality signal provided by the analysis section 11 and an attribute signal indicating the attribute of the input image provided from the outside. The determination section 12 then uses the final image quality signal as a basis to define a central part of the screen, and supplies information of defining the central part of the screen to both the center generation section 13 and the periphery generation section 14.

The center generation section 13 generates an image of the central part by performing scaling processing on the input image. This scaling processing is so performed that the input image becomes the size of the central part, which is defined by the information thereabout provided by the determination section 12. The center generation section 13 supplies the generated image of the central part to both the image combination section 15 and the periphery generation section 14.

Based on the information about the central part provided by the determination section 12, the periphery generation section 14 defines a peripheral part, i.e., a part peripheral to the central part defined by the information thereabout with a partial overlap therewith. The periphery generation section 14 generates an image of the peripheral part by extrapolation of the image of the central part provided by the center generation section 13. The generated image is supplied to the image combination section 15.

The image combination section 15 combines the image of the central part provided by the center generation section 13 with the image of the peripheral part provided by the periphery generation section 14. The image combination section 15 then outputs the resulting combined image as a wide-view image.

(Exemplary Configuration of Analysis Section)

Figure 2:
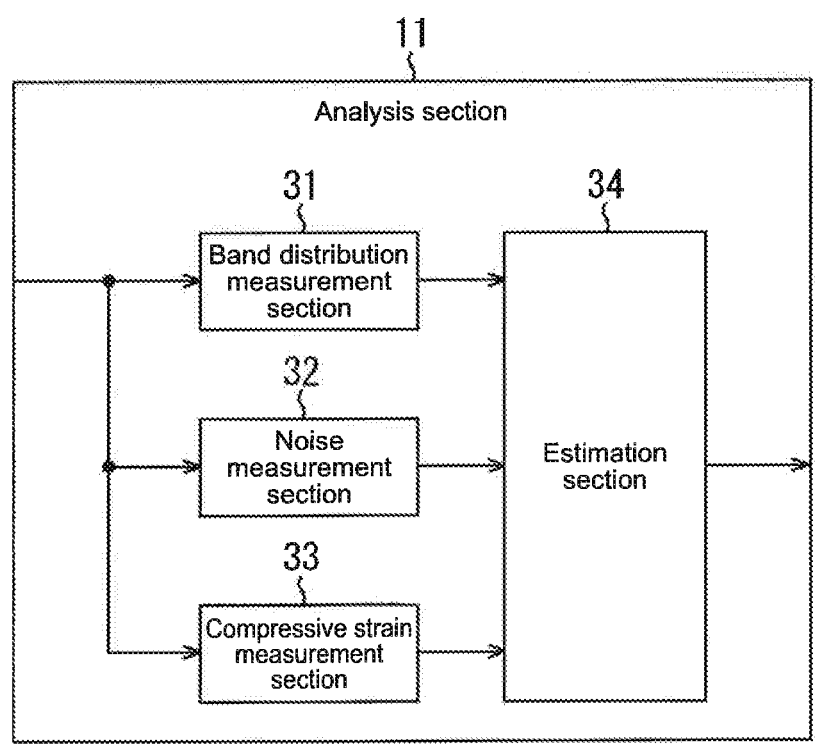
FIG. 2 is a block diagram showing an exemplary configuration of an analysis section of FIG. 1.

FIG. 2 is a block diagram showing an exemplary configuration of the analysis section 11 of FIG. 1.

The analysis section 11 of FIG. 2 includes a band distribution measurement section 31, a noise measurement section 32, a compressive strain measurement section 33, and an estimation section 34.

The band distribution measurement section 31 in the analysis section 11 refers to header information or others of an MPEG (Moving Picture Experts Group phase) stream in an input image to assess whether the band distribution therein is on the high-frequency side. As an example, the band distribution measurement section 31 assesses whether high-frequency signals in the input image are those up-converted to a relative degree. The details about this assessment are described in Japanese Patent No. 5056242, for example.

Alternatively, to assess whether the band distribution in the input image is on the high-frequency side, the band distribution measurement section 31 may perform frequency conversion such as Fourier transform, and may assess whether coefficients are on the high-frequency side. Based on the assessment result, the band distribution measurement section 31 generates a definition signal for supply to the estimation section 34. This definition signal indicates the level of high frequency in the band distribution.

The noise measurement section 32 measures an amount of noise in the input image based on information about a camera used to capture the input image, for example. For measuring the amount of noise, methods may include those described in Japanese Patent Application Laid-open No. 2008-294696 and in Japanese Patent Application Laid-open No. 2012-231389. The noise measurement section 32 supplies a noise signal indicating the measured amount of noise to the estimation section 34.

The compressive strain measurement section 33 measures an amount of compressive strain caused in the input image at the time of high compression by a codec. This measurement is made based on information about an MPEG stream in the input image, e.g., bit rate information, and decoding information. For measuring the amount of compressive strain, methods may include those described in "Blind measurement of blocking artifacts in images", Wang, Zhou, ICIP2000 and in Japanese Patent No. 5071721, for example. The compressive strain measurement section 33 supplies a compressive strain signal indicating the measured amount of compressive strain to the estimation section 34.

The estimation section 34 generates an image quality signal All based on the signals, i.e., the definition signal from the band distribution measurement section 31, the noise signal from the noise measurement section 32, and the compressive strain signal from the compressive strain measurement section 33. The image quality signal All is then supplied to the determination section 12 of FIG. 1.

(Description of Image Quality Signal all)

Figure 3:
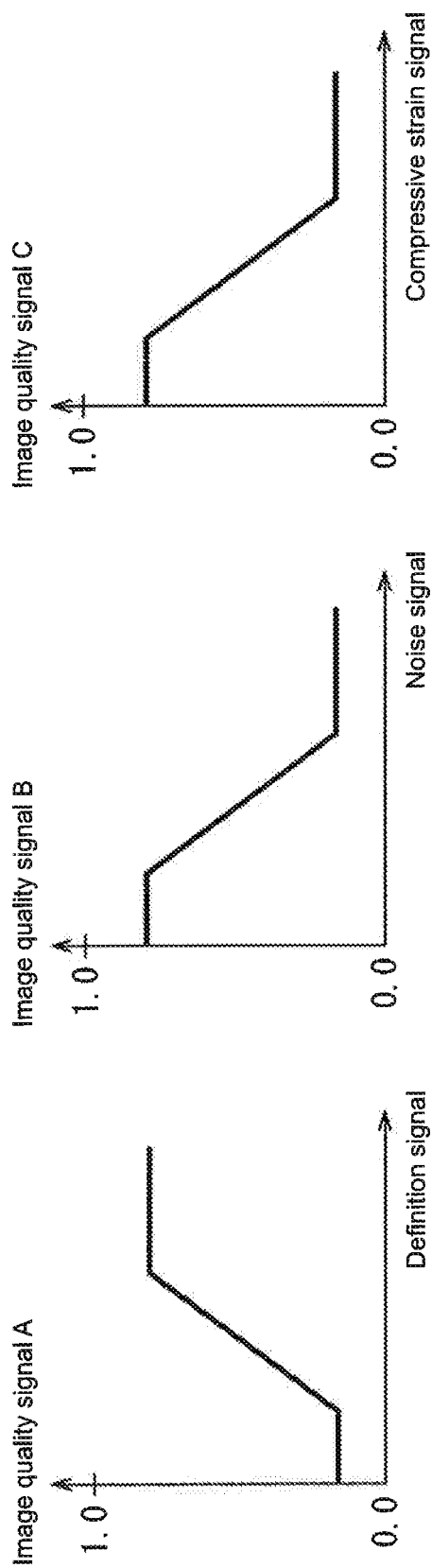
FIGS. 3A to 3C are each a diagram illustrating an image quality signal All.

FIGS. 3A to 3C are diagrams illustrating an image quality signal All generated by the estimation section 34 of FIG. 2.

As shown in FIG. 3A, the estimation section 34 generates an image quality signal A based on the value of a definition signal, i.e., the larger the value of the definition signal, the larger the value of the image quality signal A becomes (0<Image Quality Signal A<1). As shown in FIG. 3B, the estimation section 34 generates an image quality signal B based on the value of a noise signal, i.e., the larger the value of the noise signal, the smaller the value of the image quality signal B becomes (0<Image Quality Signal B<1). As shown in FIG. 3C, the estimation section 34 generates an image quality signal C based on the value of a compressive strain signal, i.e., the larger the value of the compressive strain signal, the smaller the value of the image quality signal C becomes (0<Image Quality Signal C<1).

Using these image quality signals A to C, the estimation section 34 generates a final image quality signal All using Equation 1 below.

[Equation 1]

$$\text{Image Quality Signal All} = w1 \times \text{Image Quality Signal } A + w2 \times \text{Image Quality Signal } B + w3 \times \text{Image Quality Signal } C \qquad (1)$$

In Equation 1, the factors of "w1" to "w3" each denote a weighting factor, and the sum of w1 to w3 is 1.

The image quality signal All is determined as above, so that the value thereof is increased when an image is high in quality with a higher definition, a smaller amount of noise, and a smaller amount of compressive strain.

(Exemplary Configuration of Determination Section)

Figure 4:
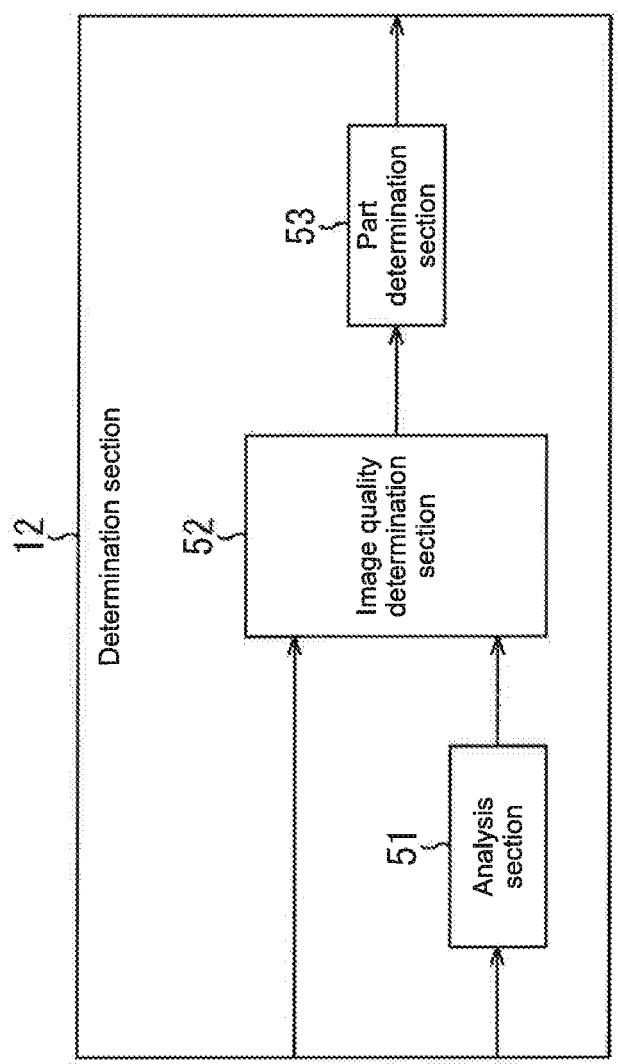
FIG. 4 is a block diagram showing an exemplary configuration of a determination section of FIG. 1.

FIG. 4 is a Block Diagram Showing an Exemplary configuration of the determination section 12 of FIG. 1.

The determination section 12 of FIG. 4 includes an analysis section 51, an image quality determination section 52, and a part determination section 53.

The analysis section 51 in the determination section 12 generates an image quality signal D based on the quantization step size of an input image. The quantization step size is provided from the outside as an attribute signal, and is included in an MPEG stream in the input image, for example. The analysis section 51 supplies the generated image quality signal D to the image quality determination section 52.

The image quality determination section 52 determines a final image quality signal Final using Equation 2 below based on the signals, i.e., the image quality signal All from the estimation section 34 of FIG. 2, and the image quality signal D from the analysis section 51. The image quality signal Final is then supplied to the part determination section 53.

[Equation 2]

$$\text{Image Quality Signal Final} = w\_all \times \text{Image Quality Signal All} + w\_D \times \text{Image Quality Signal } D \qquad 2$$

In Equation 2, the factors of "w_all" and "w_D" each denote a weighting factor, and the sum of w_all and w_D is 1.

Based on the image quality signal Final provided by the image quality determination section 52, the part determination section 53 defines a central part in the screen, i.e., a part around the center of the screen with the same aspect ratio as that of the screen. The part determination section 53 supplies a ratio of the central part to the screen, i.e., central part ratio CentralPartRatio, to both the center generation section 13 and the periphery generation section 14 of FIG. 1 as central part information.

(Exemplary Image Quality Signal D)

Figure 5:
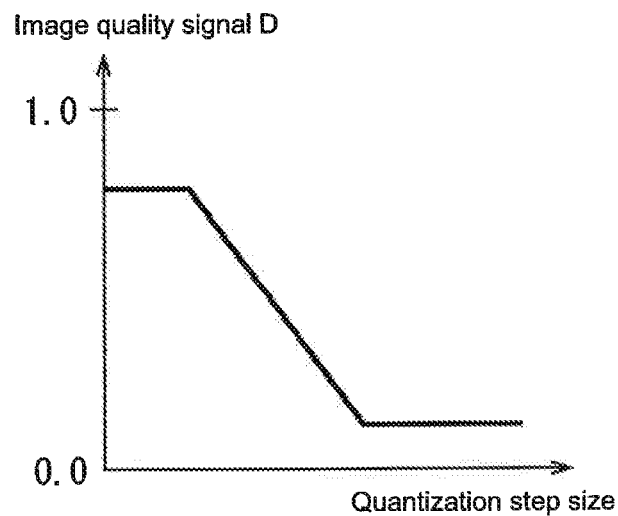
FIG. 5 is a diagram showing an exemplary image quality signal D.

FIG. 5 is a diagram showing an exemplary image quality signal D generated by the analysis section 51 of FIG. 4.

As shown in FIG. 5, the analysis section 51 generates an image quality signal D based on the quantization step size, i.e., the larger the quantization step size, the smaller the value of the image quality signal D becomes (0<Image Quality Signal D<1).

The image quality signal Final is determined based on these image quality signals D and All and by Equation 2 described above, so that the value thereof is increased when an image is high in quality with a higher definition, a smaller amount of noise and compressive strain, and a smaller quantization step size.

(Exemplary Central Part Ratio)

Figure 6:
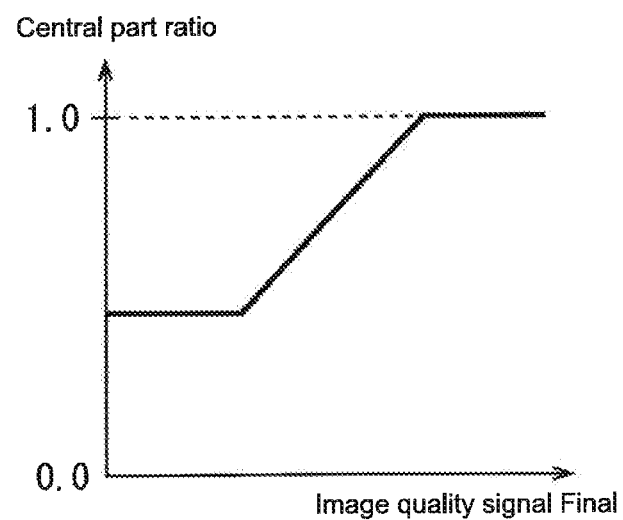
FIG. 6 is a diagram showing an exemplary central part ratio CentralPartRatio (ratio of a central part to the entire screen)

FIG. 6 is a diagram showing an exemplary central part ratio CentralPartRatio determined by the part determination section 53 of FIG. 4.

As shown in FIG. 6, the part determination section 53 determines a central part ratio CentralPartRatio to be closer to 1 as the image quality signal Final is increased in value, i.e., to make the central part be the entire screen. Therefore, when an input image is high in quality, the input image is disposed fully over a wide-view image on the screen, and when the input image is low in quality, the input image is disposed in a small size in the wide-view image on the screen.

As a result, even if the input image is low in quality with a larger amount of noise and compressive strain, the noise and compressive strain are prevented from being noticeable in the resulting wide-view image. Moreover, even if the input image is low in quality with the band distribution not on the high-frequency side, image blurring is not noticeable in the resulting wide-view image.

(Description of Central Part)

Figure 7:
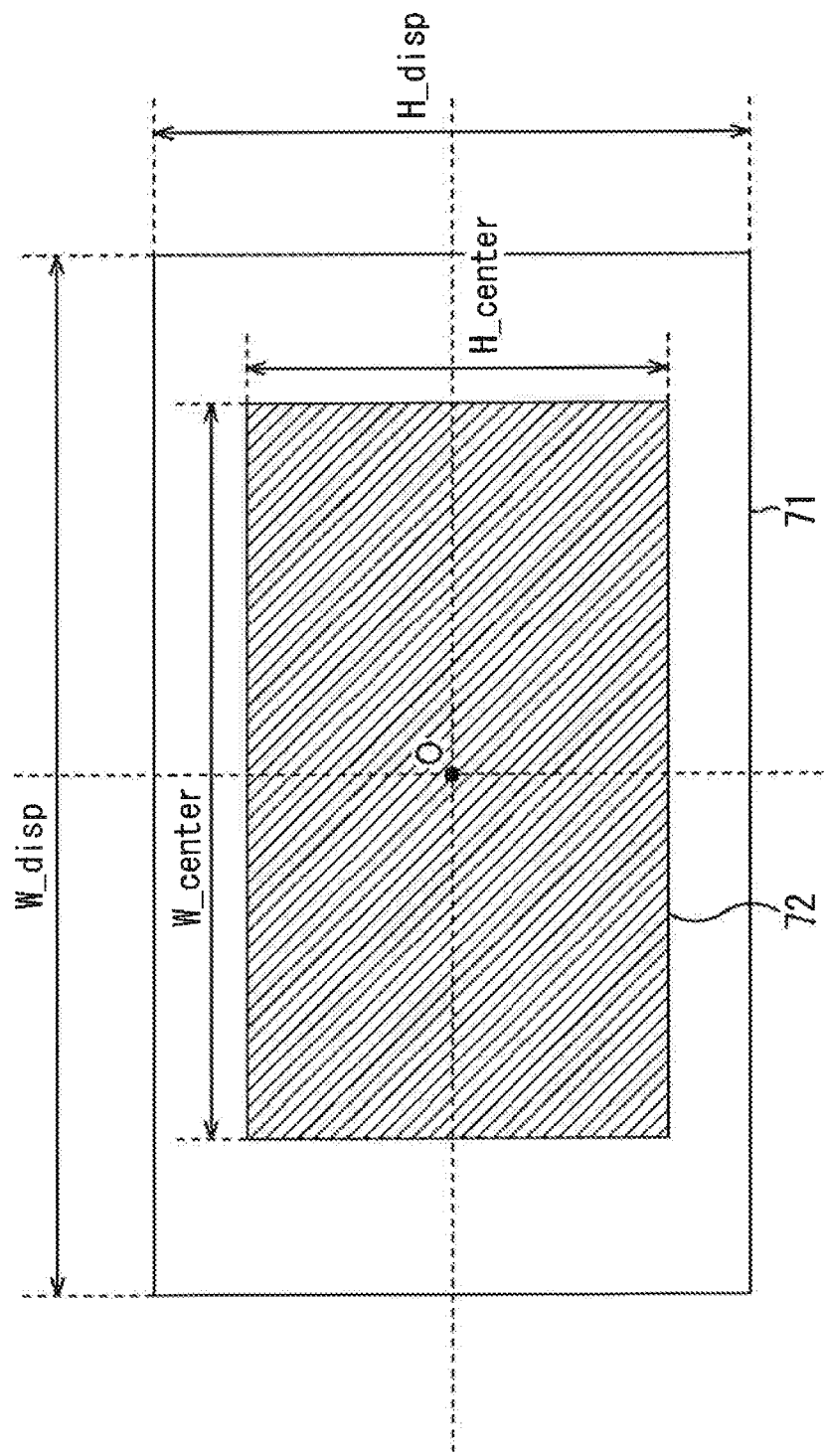
FIG. 7 is a diagram illustrating the central part.

FIG. 7 is a diagram illustrating a central part defined by the part determination section 53 of FIG. 4.

As shown in FIG. 7, a central part 72 is a part, in a screen 71, around the center O of the screen 71 with the same aspect ratio as that of the screen 71.

The central part ratio CentralPartRatio is the ratio of a horizontal length W_center of the central part 72 to a horizontal length W_disp of the screen 71, and the ratio of a vertical length H_center of the central part 72 to a vertical length H_disp of the screen 71.

(Exemplary Configuration of Center Generation Section)

Figure 8:
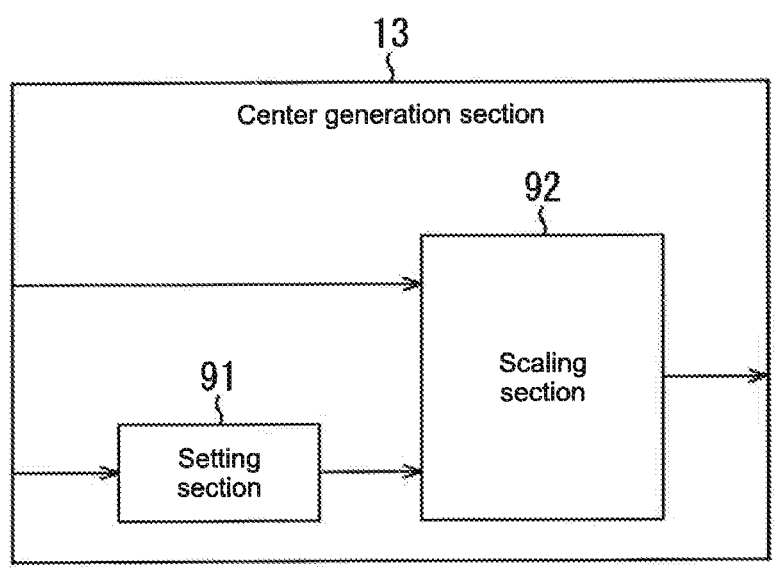
FIG. 8 is a block diagram showing an exemplary configuration of a center generation section of FIG. 1.

FIG. 8 is a block diagram showing an exemplary configuration of the center generation section 13 of FIG. 1.

The center generation section 13 of FIG. 8 includes a setting section 91, and a scaling section 92. The setting section 91 in the center generation section 13 defines a scale factor Scale using Equation 3 below based on the central part ratio CentralPartRatio provided by the part determination section 53 of FIG. 4 as central part information. The scale factor Scale is then supplied to the scaling section 92.

[Equation 3]

$$\text{Scale} = (W\_disp * CentralPartRatio)/W\_in \\ = (H\_disp * CentralPartRatio)/H\_in \qquad 3$$

In Equation 3, the factor of "W_disp" denotes the size of the screen in the lateral direction (horizontal direction), and the factor of "H_disp" denotes the size of the screen in the longitudinal direction (vertical direction). The factor of "W_in" denotes the size of an input image in the horizontal direction, and the factor of "H_in" denotes the size of the input image in the vertical direction.

Based on the scale factor Scale provided by the setting section 91, the scaling section 92 performs scaling processing on an input image. This scaling processing is so performed as to change the size of the input image to be the size of the central part. When the scale factor Scale is larger than 1, the scaling processing to be performed is scale-up processing. For this scale-up processing, techniques may include bilinear interpolation, bicubic interpolation, Lanczos interpolation, so-called superresolution, and others.

The scaling section 92 supplies the image being the result of the scaling processing to both the periphery generation section 14 and the image combination section 15 of FIG. 1 as the image of the central part.

(Exemplary Configuration of Periphery Generation Section)

Figure 9:
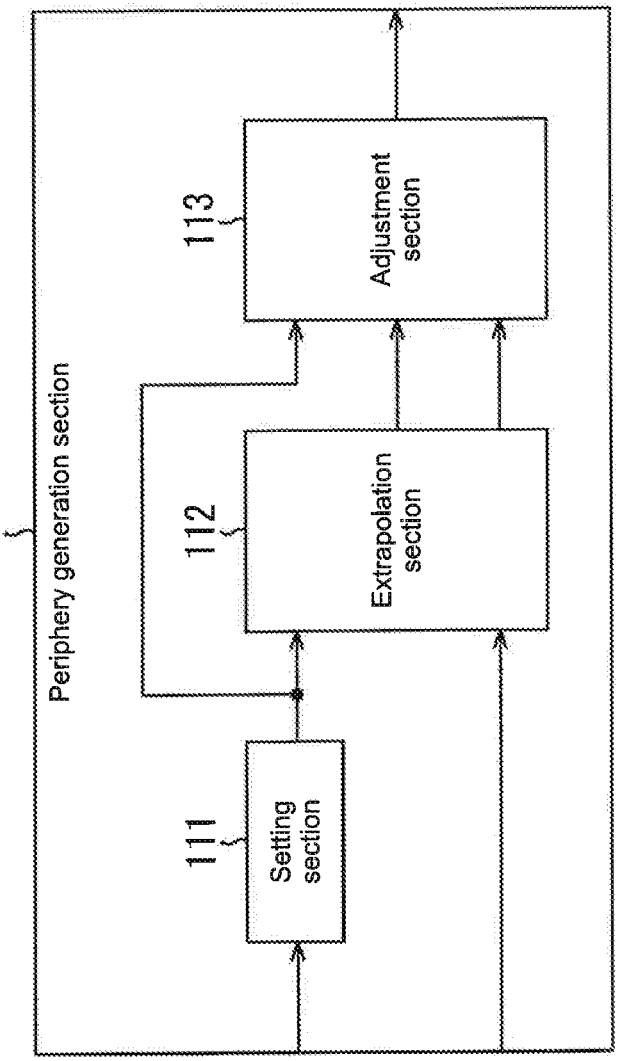
FIG. 9 is a block diagram showing an exemplary configuration of a periphery generation section of FIG. 1.

FIG. 9 is a block diagram showing an exemplary configuration of the periphery generation section 14 of FIG. 1.

The periphery generation section 14 of FIG. 9 includes a setting section 111, an extrapolation section 112, and an adjustment section 113.

The setting section 111 in the periphery generation section 14 defines a peripheral part based on the central part ratio CentralPartRatio provided by the part determination section 53 of FIG. 4 as central part information. The setting section 111 then supplies peripheral part information of defining the peripheral part to both the extrapolation section 112 and the adjustment section 113.

The extrapolation section 112 extrapolates the image of the peripheral part defined by the peripheral part information, which is provided by the setting section 111. This extrapolation is performed using the image of the central part provided by the scaling section 92 of FIG. 8. For extrapolation, techniques may include the one described in "Multi-scale ultrawide foveated video extrapolation", A. Adies, T. Avraham, and Y. Schechner. Israel Institute of Technology In ICCP, 2011, and extrapolation methods of holding, mirroring, and parallel shifting, for example. There is also a technique of using time-axis information about frames in the past or future for extrapolation as described in "Display pixel caching", Clemens Birklbauer, et. al., SIGGRAPH "11 ACM SIGGRAPH 2011 Talks Article No. 45.

The extrapolation section 112 supplies the image of the peripheral part generated by extrapolation to the adjustment section 113. The extrapolation section 112 also identifies a level of extrapolation reliability, which indicates how reliable the result of the extrapolation is. As an example, the extrapolation section 112 indicates the accuracy of matching during extrapolation by a value between 0 and 1 inclusive, and this value is the level of extrapolation reliability. The extrapolation section 112 then supplies the level of extrapolation reliability to the adjustment section 113.

Based on the level of extrapolation reliability provided by the extrapolation section 112, the adjustment section 113 adjusts the image of the peripheral part. The adjustment section 113 then supplies the resulting image of the peripheral part to the image combination section 15 of FIG. 1.

(Description of Extrapolation Methods)

Figure 10:
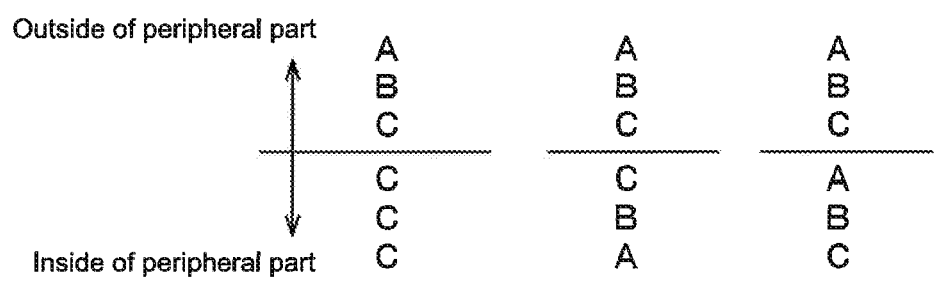
FIG. 10 is a diagram illustrating extrapolation methods of holding, mirroring, and parallel shifting.

FIG. 10 is a diagram illustrating the methods of extrapolation including holding, mirroring, and parallel shifting.

As shown on the left side in FIG. 10, when the extrapolation section 112 performs extrapolation of holding, the value of a pixel in the central part adjacent to an innermost pixel in the peripheral part, i.e., pixel value C in this example, is applied to the innermost pixel and external others in the peripheral part.

On the other hand, as shown in the middle in FIG. 10, when the extrapolation section 112 performs extrapolation of mirroring, the pixels in the peripheral part are determined by value in such a manner that the value alignment therein and that in the central part are symmetric with respect to the boundary therebetween.

In this example of FIG. 10, the pixel in the central part closest to the boundary with the peripheral part has the value of C. Therefore, the pixel in the peripheral part closet to the boundary is set to the value of C. Similarly, the pixel in the central part second closest to the boundary has the value of B. Therefore, the pixel in the peripheral part second closest to the boundary is set to the value of B.

As shown on the right side in FIG. 10, when the extrapolation section 112 performs extrapolation of parallel shifting, a set of values of pixels in the central part in a predetermined range from the boundary with the peripheral part is applied to pixels in the peripheral part from outermost to innermost.

In this example of FIG. 10, the pixel in the central part closest to the boundary with the peripheral part has the value of C. Therefore, the outermost pixel in the peripheral part is set to the value of C. Similarly, the pixel in the central part second closest to the boundary has the value of B. Therefore, the pixel in the peripheral part next to the outermost pixel therein is set to the value of B.

(Exemplary Configuration of Adjustment Section)

Figure 11:
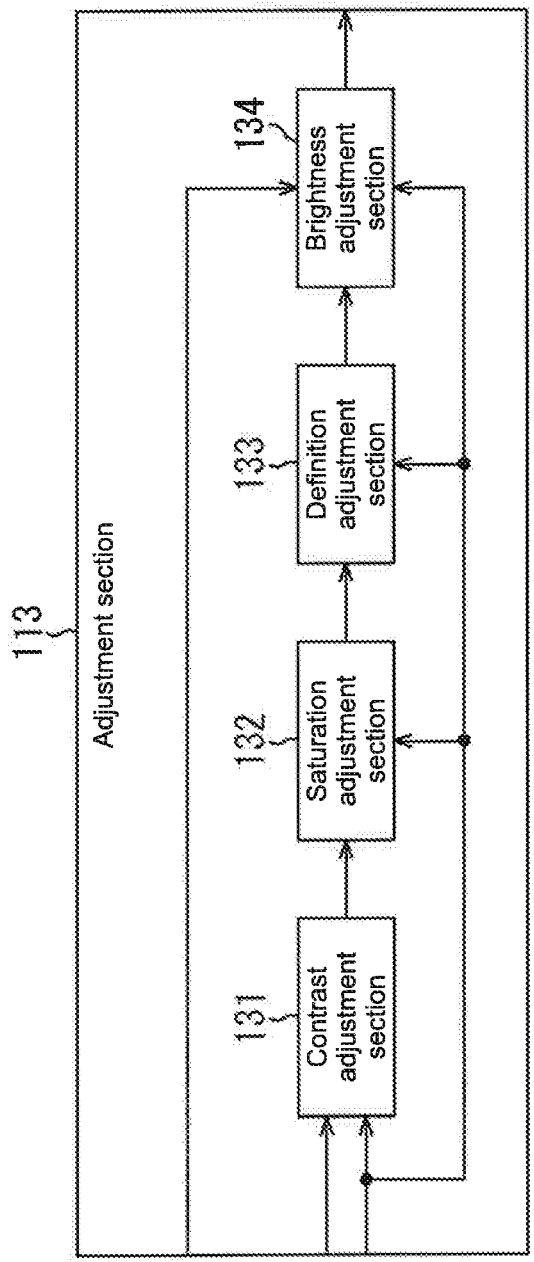
FIG. 11 is a block diagram showing an exemplary configuration of an adjustment section of FIG. 9.

FIG. 11 is a block diagram showing an exemplary configuration of the adjustment section 113 of FIG. 9.

The adjustment section 113 of FIG. 11 includes a contrast adjustment section 131, a saturation adjustment section 132, a definition adjustment section 133, and a brightness adjustment section 134.

The contrast adjustment section 131 in the adjustment section 113 adjusts the contrast by changing the dynamic range of the image of the peripheral part provided by the extrapolation section 112. This contrast adjustment is made based on the level of extrapolation reliability provided by the extrapolation section 112. To be specific, the contrast adjustment section 131 performs computations on an intensity component EY for each of the pixels in the image of the peripheral part using Equation 4 below, thereby obtaining an intensity component LCnst_Y for each of the pixels in the contrast-adjusted image of the peripheral part.

[Equation 4]

$$LCnst\_Y=(EY-AVE\_Y)*CnstGain+AVE\_Y \qquad 4$$

In Equation 4, the factor of "AVE_Y" denotes a mean value of the intensity components in the image of the peripheral part, and the factor of "CnstGain" denotes a contrast gain that is defined based on the level of extrapolation reliability.

The contrast adjustment section 131 supplies the contrast-adjusted image of the peripheral part to the saturation adjustment section 132. This contrast-adjusted image includes the intensity components LCnst_Y of the pixels in the image of the peripheral part after the contrast adjustment, and a color-difference component of each of the pixels in the image of the peripheral part provided by the extrapolation section 112.

The saturation adjustment section 132 performs saturation adjustment on the image of the peripheral part provided by the contrast adjustment section 131 based on the level of extrapolation reliability. To be specific, the saturation adjustment section 132 performs saturation adjustment on the image of the peripheral part by multiplying a saturation component CurSatu of each of the pixels in the image of the peripheral part by a saturation gain Sgain, which is defined based on the level of extrapolation reliability. The saturation adjustment section 132 then supplies the saturation-adjusted image of the peripheral part to the definition adjustment section 133.

The definition adjustment section 133 performs definition adjustment on the image of the peripheral part provided by the saturation adjustment section 132 based on the level of extrapolation reliability. To be specific, the definition adjustment section 133 performs filter processing on the image of the peripheral part using a smoothing filter, e.g., Gaussian filter. This smoothing filter is with taps, the number of which is determined based on the level of extrapolation reliability. The definition adjustment section 133 then supplies the filter-processed image of the peripheral part to the brightness adjustment section 134.

The brightness adjustment section 134 performs brightness adjustment on the image of the peripheral part provided by the definition adjustment section 133. This brightness adjustment is made based on the level of extrapolation reliability, and the peripheral part information provided by the setting section 111. To be specific, the brightness adjustment section 134 performs computations on an intensity (or lightness) component SmthY for each of the pixels in the image of the peripheral part using Equation 5 below, thereby obtaining an intensity component PY for each of the pixels in the brightness-adjusted image of the peripheral part.
[Equation 5]

$$PY = SmthY - DarkOffsetPred - DarkOffsetDist \quad 5$$

In Equation 5, the factor of "DarkOffsetPred" denotes an offset value determined based on the level of extrapolation reliability, and the factor of "DarkOffsetDist" denotes an offset value determined based on the peripheral part information.

The brightness adjustment section 134 supplies the brightness-adjusted image of the peripheral part to the image combination section 15 of FIG. 1. This brightness-adjusted image includes the intensity components PY of the pixels in the brightness-adjusted image of the peripheral part, and the color-difference components of the pixels in the image of the peripheral part provided by the definition adjustment section 133.

(Exemplary Contrast Gain)

Figure 12:
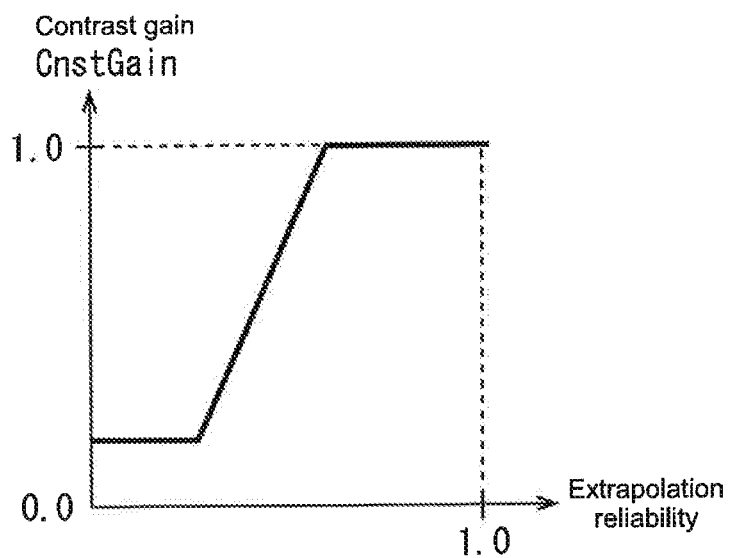
FIG. 12 is a diagram showing an exemplary contrast gain CnstGain.

FIG. 12 is a diagram showing an exemplary contrast gain CnstGain.

As shown in FIG. 12, a contrast gain CnstGain is so set as to be larger with an increase of the level of extrapolation reliability, and takes a value between 0 and 1 inclusive. Accordingly, when the level of extrapolation reliability is low, the contrast gain CnstGain is reduced so that the image of the peripheral part becomes low in contrast. This accordingly makes the image of the peripheral part not noticeable.

(Exemplary Saturation Gain)

Figure 13:
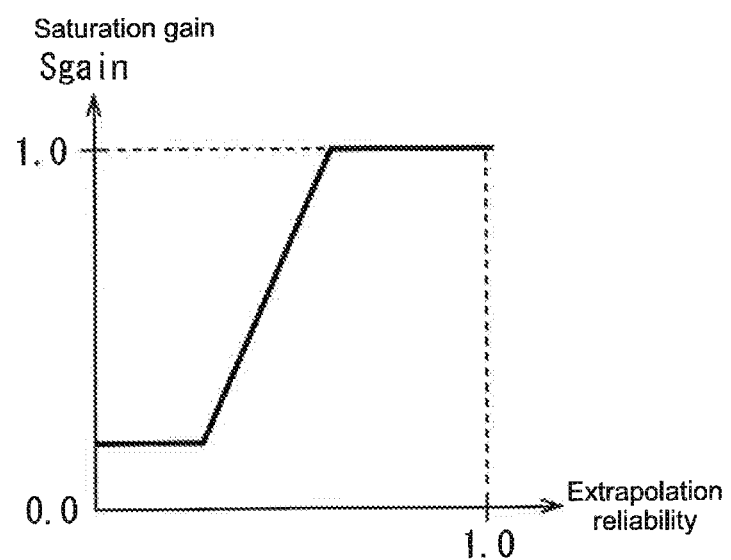
FIG. 13 is a diagram showing an exemplary saturation gain Sgain.

FIG. 13 is a diagram showing an exemplary saturation gain Sgain.

As shown in FIG. 13, a saturation gain Sgain is so set as to be larger with an increase of the level of extrapolation reliability, and takes a value between 0 and 1 inclusive. Accordingly, when the level of extrapolation reliability is low, the saturation gain Sgain is reduced, so that the image of the peripheral part becomes low in saturation. This makes the image of the peripheral part not noticeable.

(Example of the Number of Taps of Smoothing Filter)

Figure 14:
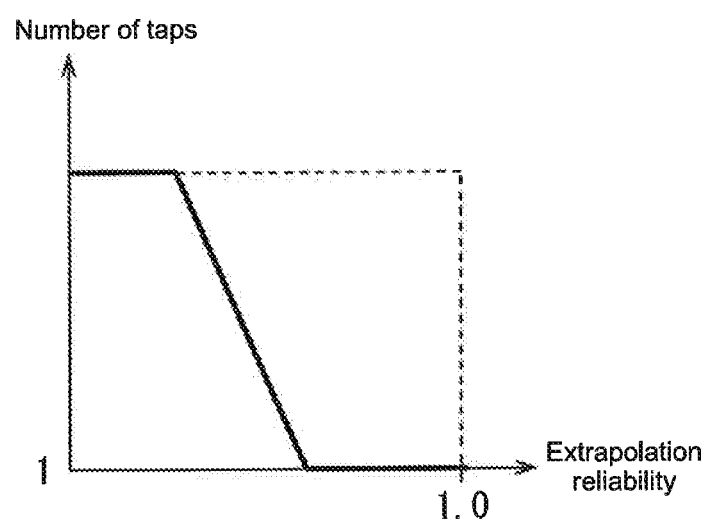
FIG. 14 is a diagram showing an example of the number of taps of a smoothing filter.

FIG. 14 is a diagram showing an example of the number of taps of a smoothing filter in the definition adjustment section 133 of FIG. 11.

As shown in FIG. 14, the number of taps of a smoothing filter is so set as to be larger with a decrease of the level of extrapolation reliability, and takes a value of 1 or larger. Accordingly, when the level of extrapolation reliability is low, the number of taps of the smoothing filter is increased, so that the filter-processed image of the peripheral part looks more blurred. This accordingly makes the image of the peripheral part not noticeable.

(Exemplary Offset Value at the Time of Brightness Adjustment)

Figure 15:
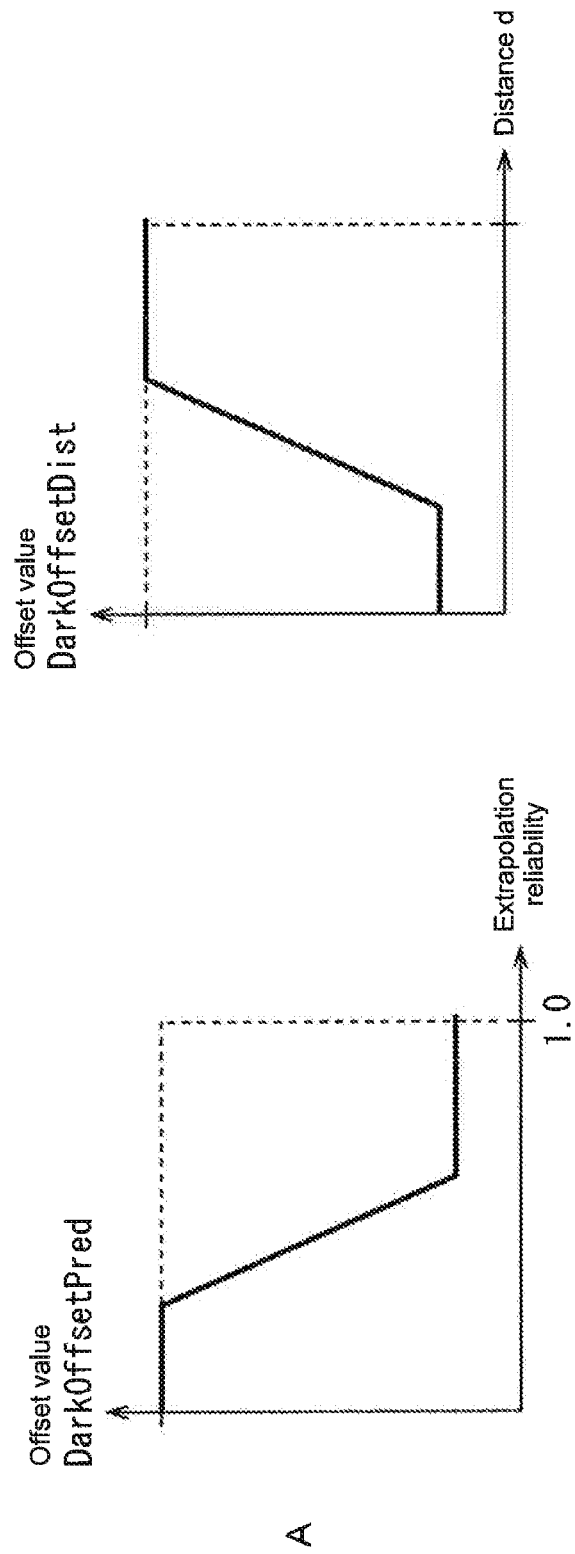
FIGS. 15A and 15B are diagrams respectively showing exemplary offset values DarkOffsetPred and DarkOffsetDist.

FIGS. 15A and 15B are diagrams respectively showing exemplary offset values DarkOffsetPred and DarkOffsetDist at the time of brightness adjustment by the brightness adjustment section 134 of FIG. 11.

As shown in FIG. 15A, the offset value DarkOffsetPred is so set as to be smaller with an increase of the level of extrapolation reliability. On the other hand, as shown in FIG. 15B, the offset value DarkOffsetDist is so set as to be larger with an increase of a distance d, which is a distance of the corresponding pixel from the internal edge of the peripheral part.

Figure 16:
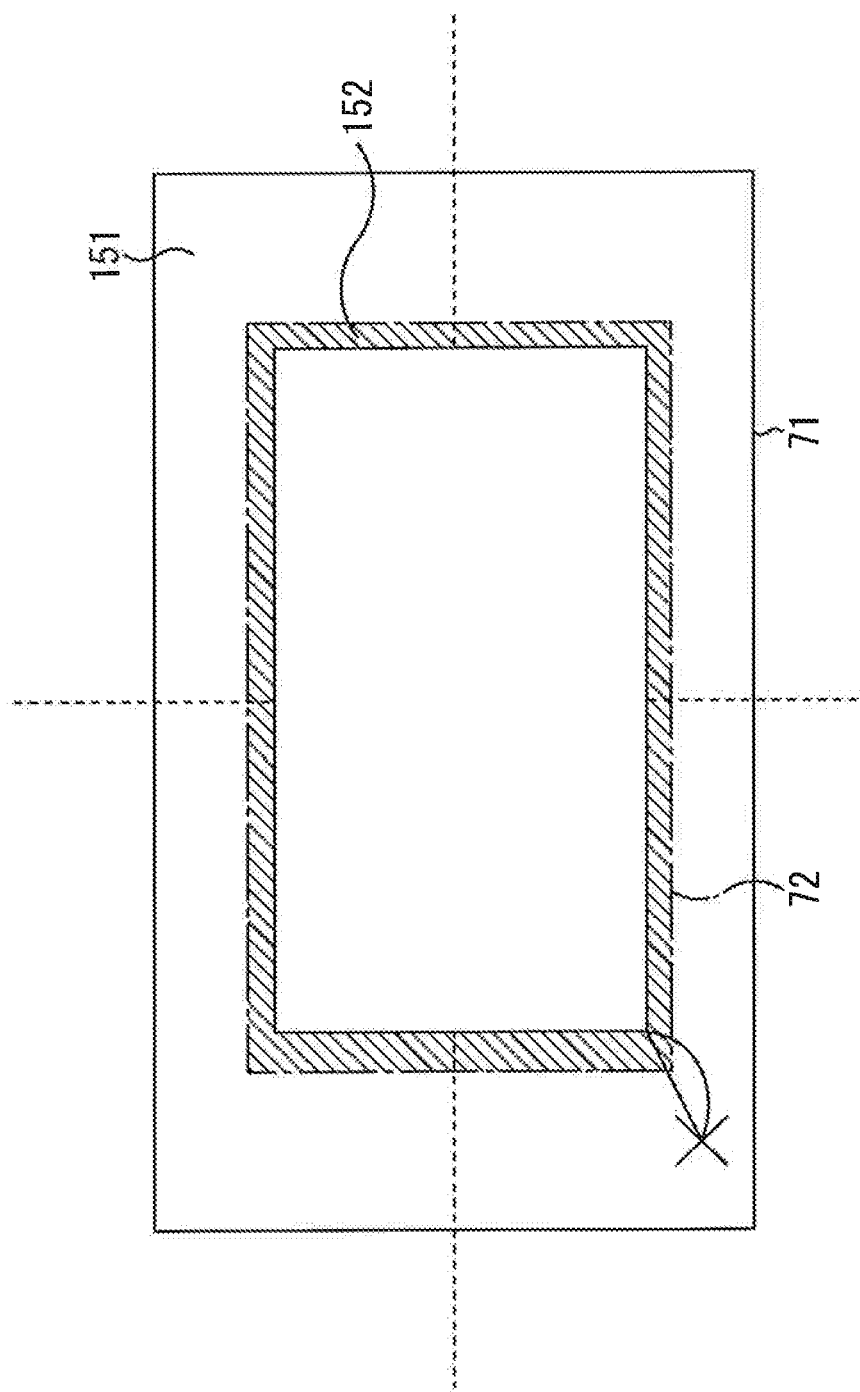
FIG. 16 is a diagram showing a distance.

To be specific, as shown in FIG. 16, there is an overlapped part 152, which is an internal portion of a peripheral part 151 in the screen 71 overlapped with the central part 72. The offset value DarkOffsetDist is so set as to be larger with an increase of the distance d, which is a distance of the corresponding pixel from the internal edge of the peripheral part 151, i.e., the distance from the internal edge of the overlapped part 152.

As described above, when the level of extrapolation reliability is low, the offset value DarkOffsetPred is increased, and the image of the peripheral part is reduced in brightness. This accordingly makes the image of the peripheral part not noticeable. Moreover, the offset value DarkOffsetDist is increased with an increase of the distance d, so that the pixels are reduced in brightness as get closer to the outer edge. This accordingly reduces artifacts caused by extrapolation.

(Description of Image Combination)

Figure 17:
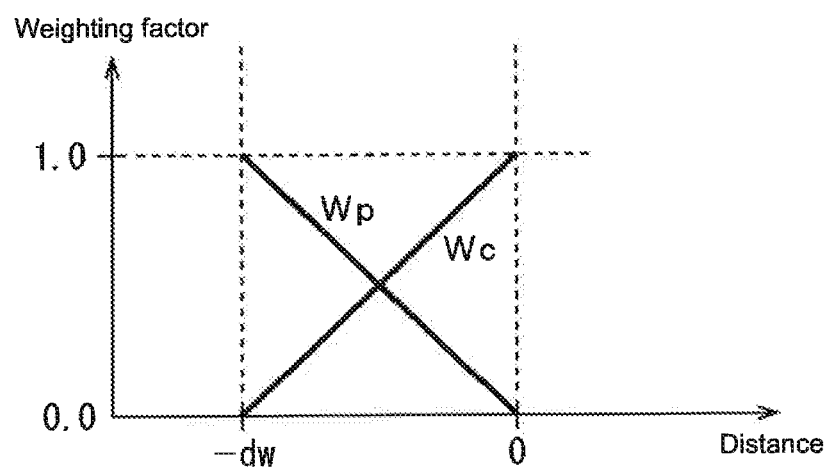
FIG. 17 is a diagram illustrating image combination by an image combination section of FIG. 1.

FIG. 17 is a diagram for illustrating image combination by the image combination section 15 of FIG. 1.

As to the image of the central part provided by the center generation section 13, the image combination section 15 disposes, in the screen, the portion of the image without the part overlapped with the peripheral part. As to the image of the peripheral part provided by the periphery generation section 14, the image combination section 15 disposes, in the screen, the portion of the image without the part overlapped with the central part.

The image combination section 15 then performs image combination on a pixel basis using Equation 6 below, i.e., combines the image of the overlapped part in the central part with the image of the overlapped part in the peripheral part. The image combination section 15 disposes the resulting image in the overlapped part in the screen.

[Equation 6]

$$Blend = Wp \times Psig + Wc \times Csig \quad 6$$

In Equation 6, the factor of "Blend" denotes a value of each pixel in the overlapped part after the image combination. The Factor of "Psig" denotes a value of each pixel in the image of the overlapped part in the peripheral part, and the factor of "Csig" denotes a value of each pixel in the image of the overlapped part in the central part.

Also in Equation 6, the factors of "Wp" and "Wc" each denote a weighting factor based on the horizontal or vertical distance from the inner edge of the peripheral part to each pixel therein, and the sum of the weighting factors Wp and Wc is 1. To be specific, when the pixel corresponding to the pixel value Blend is in the overlapped part on the right or left side of the central part, the weighting factors Wp and Wc in use are those based on the horizontal distance. On the other hand, when the pixel corresponding to the pixel value Blend is in the overlapped part above or below the central part, the weighting factors wp and Wc in use are those based on the vertical distance.

Assuming that the horizontal (or vertical) position of the peripheral part at the innermost edge is 0, the weighting factor Wp is 1 when the horizontal (or vertical) position of the corresponding pixel is at −dw, which is the horizontal (or vertical) position of the overlapped part at the outermost edge as shown in FIG. 17. The weighting factor Wp is decreased as the horizontal (or vertical) position of the corresponding pixel comes closer to 0, and reaches 0 when the corresponding pixel is positioned at 0.

On the other hand, as shown in FIG. 17, the weighting factor Wc is 0 when the horizontal (or vertical) position of the corresponding pixel is at −dw. The weighting factor Wc is increased as the horizontal (vertical) position of the corresponding pixel comes closer to 0, and reaches 1 when the corresponding pixel is positioned at 0.

The image combination section 15 outputs a wide-view image, which is an image of the screen including the image of the part without the overlapped part between the peripheral part and the central part, and the image of the overlapped part after the image combination.

(Description of Processing by Image Processing Apparatus)

Figure 18:
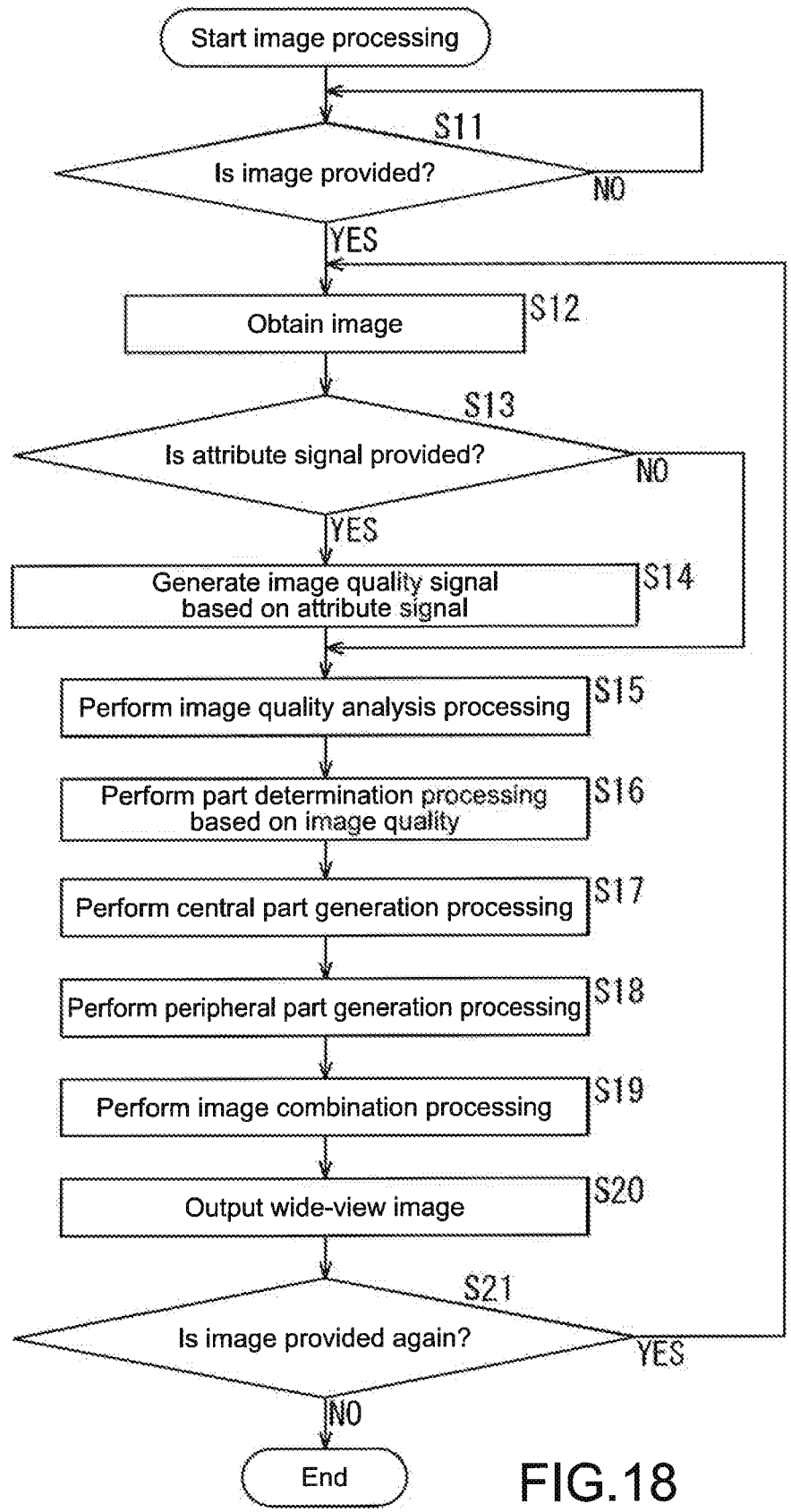
FIG. 18 is a flowchart of image processing by the image processing apparatus of FIG. 1.

FIG. 18 is a flowchart of image processing by the image processing apparatus 10 of FIG. 1.

In step S11 of FIG. 18, the image processing apparatus 10 assesses whether an image is input from the outside. Herein, the image may be input on the basis of a frame or a plurality of frames.

When the assessment in step S11 is made that no image is input yet from the outside, the image processing apparatus 10 waits for an image input from the outside.

When the assessment in step S11 is made that an image is input from the outside, in step S12, the image processing apparatus 10 obtains the image as an input image. In step S13, the determination section 12 assesses whether an attribute signal is input from the outside. When the assessment in step S13 is made that an attribute signal is input from the outside, the procedure goes to step S14.

In step S14, the analysis section 51 in the determination section 12 (FIG. 4) generates an image quality signal D based on the quantization step size of the image input from the outside as the attribute signal. The analysis section 51 then supplies the generated image quality signal D to the image quality determination section 52, and the procedure goes to step S15.

On the other hand, when the assessment in step S13 is made that no attribute signal is input yet from the outside, the analysis section 51 supplies the image quality signal D as 0 to the image quality determination section 52, and the procedure goes to step S15.

In step S15, the analysis section 11 makes an assessment as to the band distribution in the input image, and measures an amount of noise and compressive strain, thereby performing image quality analysis processing of generating an image quality signal All. The analysis section 11 supplies the generated image quality signal All to the determination section 12.

In step S16, the determination section 12 determines a final image quality signal Final based on the signals, i.e., the image quality signal All from the analysis section 11, and the image quality signal D generated by the analysis section 51. The determination section 12 then performs part determination processing based on the image quality for determining the central part ratio CentralPartRatio. The determination section 12 supplies the determined central part ratio CentralPartRatio as the central part information to both the center generation section 13 and the periphery generation section 14.

In step S17, the center generation section 13 defines the scale factor Scale based on the central part ratio CentralPartRatio from the determination section 12, and performs scaling processing on the input image based on the scale factor Scale, thereby performing central part generation processing of generating an image of the central part. The center generation section 13 supplies the generated image of the central part to both the periphery generation section 14 and the image combination section 15.

In step S18, the periphery generation section 14 defines a peripheral part based on the central part ratio CentralPartRatio from the determination section 12. The periphery generation section 14 then generates an image of the peripheral part by extrapolation of the image of the central part, thereby performing peripheral part generation processing of adjustment based on the level of extrapolation reliability. The periphery generation section 14 supplies the image of the peripheral part being the result of the adjustment to the image combination section 15.

In step S19, the image combination section 15 performs image combination processing of combining the image of the central part from the center generation section 13 with the image of the peripheral part from the periphery generation section 14. In step S20, the image combination section 15 outputs the combined image being the result of the image combination processing as a wide-view image.

In step S21, the image processing apparatus 10 assesses whether a new image is input. When the assessment in step S21 is made that a new image is input, the procedure returns to step S12, and the processes from steps S12 to S21 are repeated until the image input is stopped.

On the other hand, when the assessment in step S21 is made that no new image is input, this is the end of the procedure.

As described above, the image processing apparatus 10 generates an image of a central part by performing scaling processing on an input image based on an image quality signal, and then generates an image of a peripheral part by extrapolation of the input image. The image processing apparatus 10 then combines the image of the central part and the image of the peripheral part, so that a wide-view image is generated.

Therefore, even if an image quality signal is small in value, i.e., even if the quality of an image is low, with no use of information about viewer's part designation, detection results of various sensors, or others, the low quality may not be noticeable in the resulting wide-view image by performing scaling processing of reducing the size of the image of the central part. That is, a wide-view image is so generated as to be appropriate to the image quality. As a result, the wide-view image is with better realistic effects.

A wide-view image may be generated with a high level of image quality even if an input image is higher in resolution than when it is captured, is low in resolution as is obtained over a network, is noisy due to low luminance, or is noisy due to low electric field at the time of analog broadcast, for example.

On the other hand, if an input image is scaled up to the size of the screen when it is blurred, is noisy, or is with a large amount of compressive strain, for example, the resulting image looks degraded as is blurred, noisy, or compressed.

Moreover, because the image processing apparatus 10 generates an image of a peripheral part by extrapolation, the resulting combined image has a wider view, thereby leading to a better sense of realism (immersive experience).

Note that, in the first embodiment, the analysis section 11 includes three measurement sections, i.e., the band distribution measurement section 31, the noise measurement section 32, and the compressive strain measurement section 33. However, the analysis section 11 does not necessarily include all of these measurement sections, and may include at least one of the measurement sections.

Second Embodiment

Exemplary Configuration of Image Processing Apparatus in Second Embodiment

Figure 19:
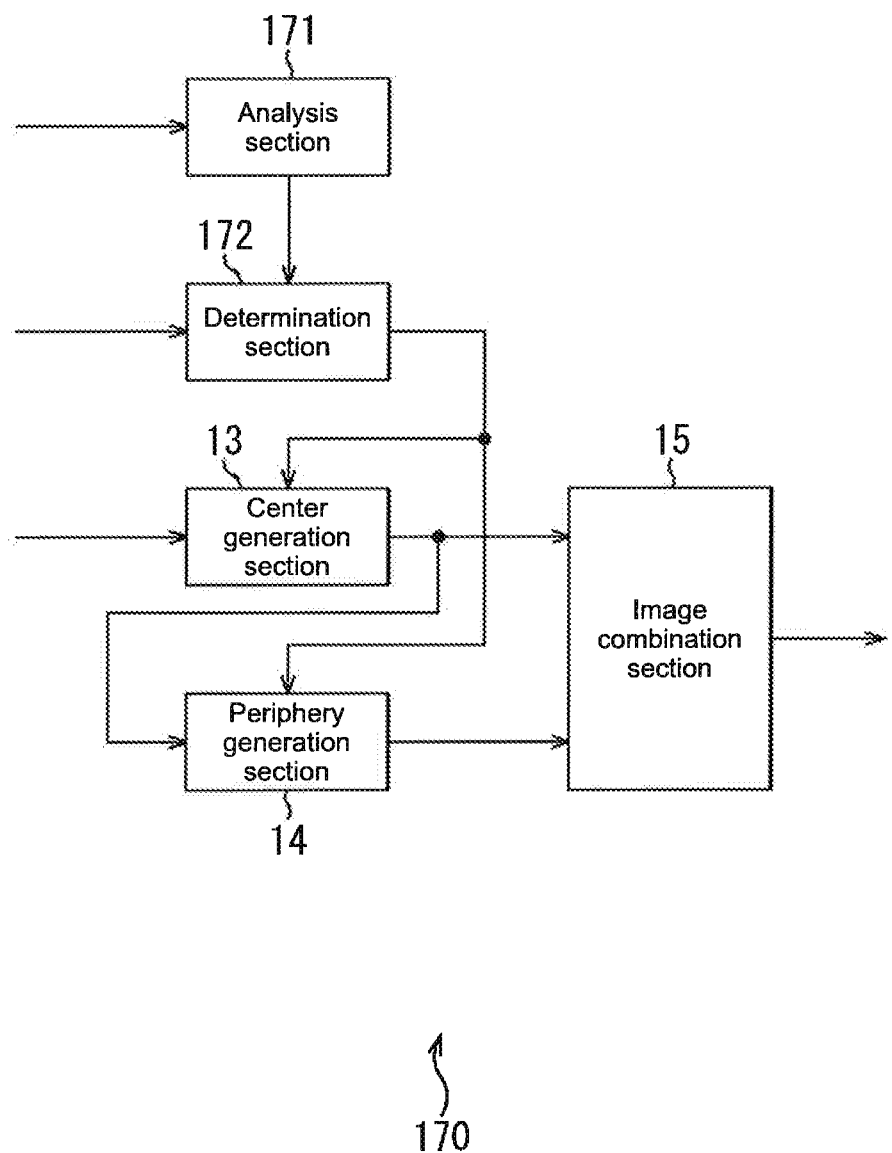
FIG. 19 is a block diagram showing an exemplary configuration of an image processing apparatus in a second embodiment with the application of the present disclosure.

FIG. 19 is a block diagram showing an exemplary configuration of an image processing apparatus in a second embodiment with the application of the present disclosure.

In the configuration of FIG. 19, any component same as that in FIG. 1 is provided with the same reference numeral, and may not be described again as appropriate if it is already described.

Unlike the image processing apparatus 10 of FIG. 1, an image processing apparatus 170 of FIG. 19 includes an analysis section 171 as an alternative to the analysis section 11, and a determination section 172 as an alternative to the determination section 12. The image processing apparatus 170 defines a scale factor Scale not based on the image quality of an input image but based on a level of significance.

The analysis section 171 extracts a predetermined part from an input image based on information thereabout for use as characteristics of the input image. Based on the part, the analysis section 171 supplies a significance map to the determination section 172. This significance map represents, by a value, the level of significance of each pixel in the input image.

The determination section 172 determines a final significance map based on the significance map provided by the analysis section 171, and an attribute signal. The determination section 172 then defines a central part based on the final significance map, and supplies information about the central part to both the center generation section 13 and the periphery generation section 14.

(Exemplary Configuration of Analysis Section)

Figure 20:
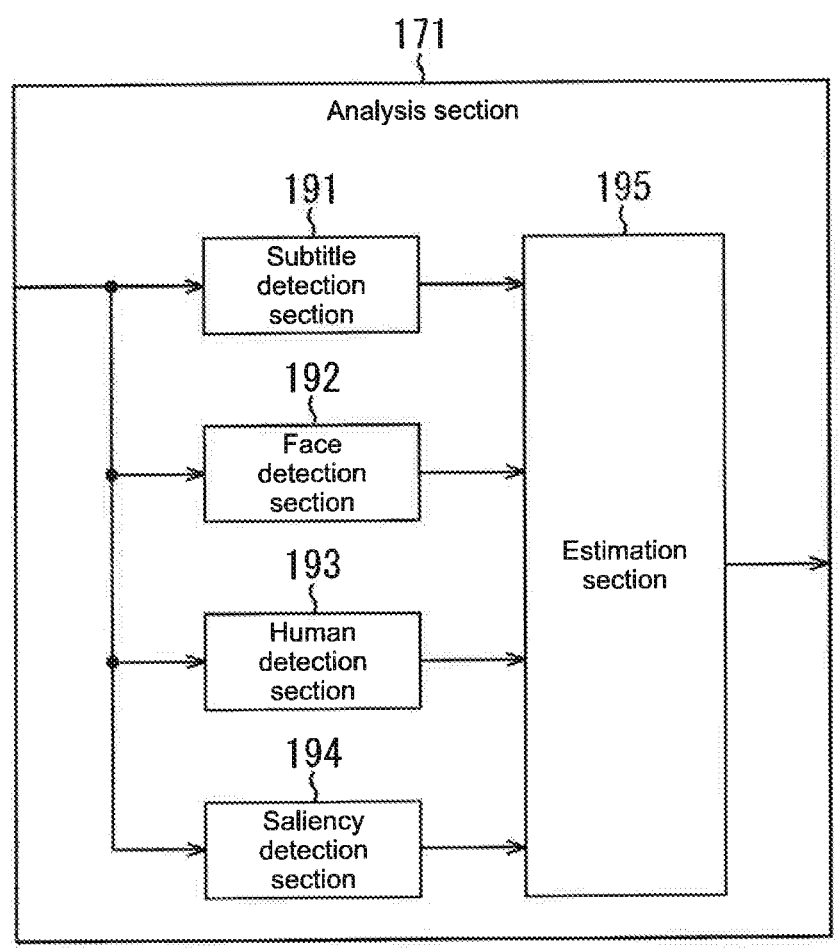
FIG. 20 is a block diagram showing an exemplary configuration of an analysis section of FIG. 19.

FIG. 20 is a block diagram showing an exemplary configuration of the analysis section 171 of FIG. 19.

The analysis section 171 of FIG. 20 includes a subtitle detection section 191, a face detection section 192, a human detection section 193, a saliency detection section 194, and an estimation section 195.

The subtitle detection section 191 in the analysis section 171 detects a subtitle part based on OSD (On Screen Display) information or others about an input image. The subtitle part is a part of the input image including subtitles. For detecting the subtitle part, there is a method described in "A comprehensive method for multilingual video text detection", Lyu, M. R.: Jiqiang Song; Min Cai: localization, and extraction. IEEE Transactions on Circuits and Systems for Video Technology 15(2), 243-255 (2005), for example.

The subtitle detection section 191 generates a subtitle map, which indicates the position, size, and level of certainty of the detected subtitle part. The subtitle map is an image indicating the level of certainty of each pixel in the input image being in the subtitle part, and the level of certainty is represented by a value from 0 to 255. In this example, a larger pixel value in the subtitle map means a higher level of certainty for the pixel being in the subtitle part. The subtitle detection section 191 supplies the generated subtitle map to the estimation section 195.

The face detection section 192 detects a face part from the input image. When the input image is an image during visual communication, for example, the face detection section 192 detects a face part based on information about each window position.

The face detection section 192 then generates a face map, which indicates the position, size, and level of certainty of the detected face part. The face map is an image indicating the level of certainty of each pixel in the input image being in the face part, and the level of certainty is represented by a value from 0 to 255. In this example, a larger pixel value in the face map means a higher level of certainty for the pixel being in the face part. The face detection section 192 supplies the generated face map to the estimation section 195.

The human detection section 193 detects a human part from the input image. When the input image is the one captured by a surveillance camera, for example, the human detection section 193 detects the human part based on information about a tracking target provided by the surveillance camera.

The human detection section 193 then generates a human map indicating the position, size, and level of certainty of the detected human part. The human map is an image indicating the level of certainty of each pixel in the input image being in the human part, and the level of certainty is represented by a value from 0 to 255. In this example, a larger pixel value in the human map means a higher level of certainty for the pixel being in the human part. The human detection section 193 supplies the generated human map to the estimation section 195.

The saliency (eye-catching degree) detection section 194 detects a part of an eye-catching object from the input image as a main object part in response to viewer's designation or others. For detecting the object part, there is a method described in Japanese Patent Application Laid-open No. 2010-262506, for example. The saliency detection section 194 generates an object map indicating the position, size, and level of certainty of the detected object part.

The object map is an image indicating the level of certainty of each pixel in the input image being in the object part, and the level of certainty is represented by a value from 0 to 255. In this example, a larger pixel value in the object map means a higher level of certainty for the pixel being in the object part. The saliency detection section 194 supplies the generated object map to the estimation section 195.

The estimation section 195 generates a significance map based on the maps, i.e., the subtitle map from the subtitle detection section 191, the face map from the face detection section 192, the human map from the human detection section 193, and the object map from the saliency detection section 194.

(Description of Generating Significance Map)

Figure 21:
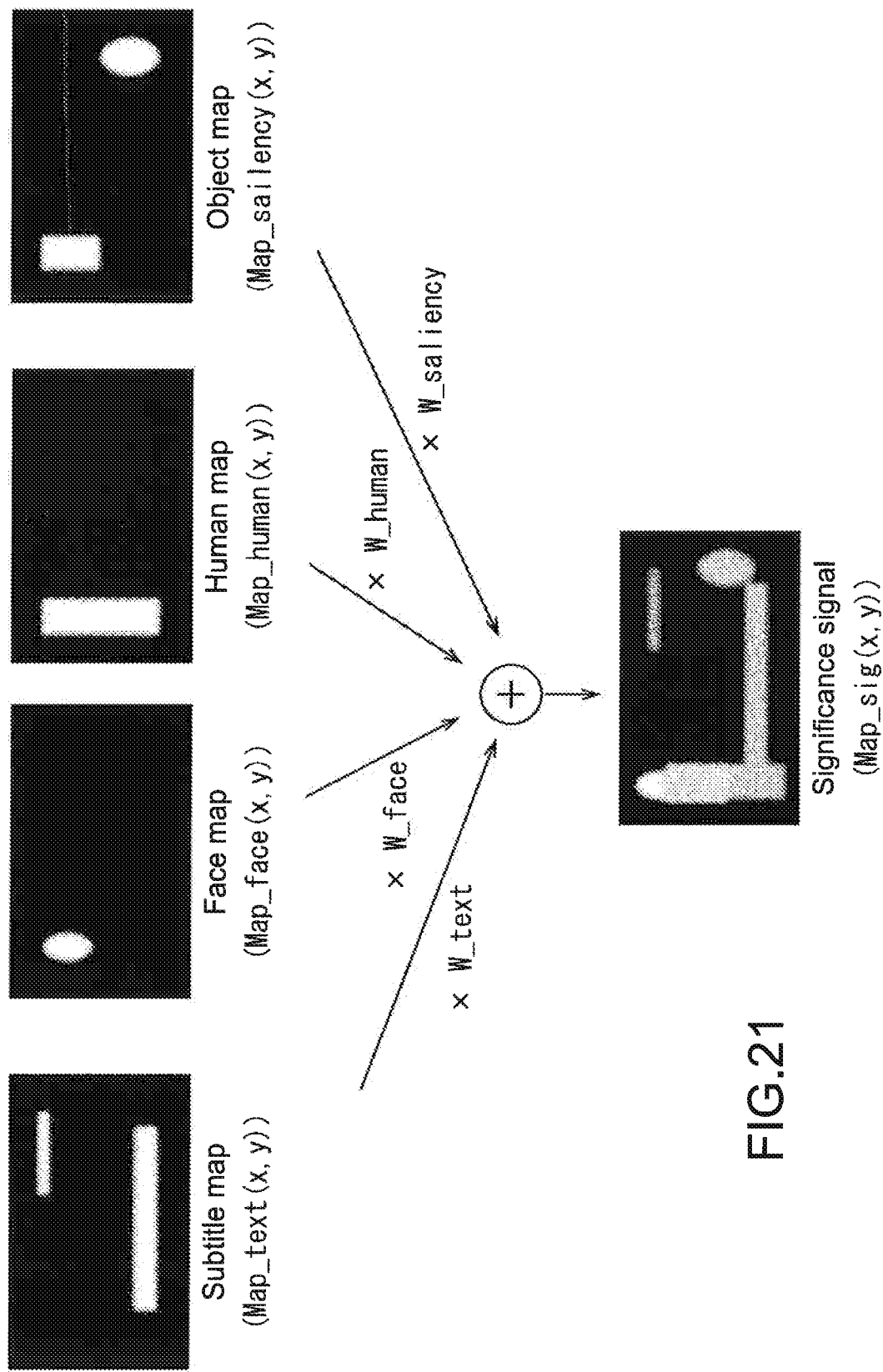
FIG. 21 is a diagram illustrating how a significance map is generated.

FIG. 21 is a diagram illustrating how a significance map is generated by the estimation section 195 of FIG. 20.

As shown in FIG. 21, by Equation 7 below, the estimation section 195 obtains a weighted mean for each pixel using pixel values thereof in the various maps, i.e., pixel value Map_text(x, y) of the subtitle map, pixel value Map_face(x, y) of the face map, pixel value Map_human(x, y) of the human map, and pixel value Map_saliency(x, y) of the object map. The obtained weighted mean is used as a pixel value in the significance map.

[Equation 7]

$$\text{Map\_sig}(x, y) = \text{W\_text} * \text{Map\_text}(x, y) + \text{W\_face} * \text{Map\_face}(x, y) + \\ \text{W\_human} * \text{Map\_human}(x, y) + \text{W\_saliency} * \text{Map\_saliency}(x, y)$$

7

In Equation 7, the factor of "Map_sig(x, y)" denotes a pixel value in the significance map, and the factors of "W text", "W face", "W_human", and "W_saliency" each denote a weighting factor. The sum of these weighting factors is 1.

In the second embodiment, the weighted mean is used as a pixel value in the significance map. Alternatively, a pixel value in the significance map may be the maximum value among the pixel value Map_text(x, y), the pixel value Map_face(x, y), the pixel value Map_human(x, y), and the pixel value Map_saliency(x, y). Still alternatively, a pixel value in the significance map may be the weighted mean after being normalized in such a manner that the dynamic range covers 0 to 255.

(Exemplary Configuration of Determination Section)

Figure 22:
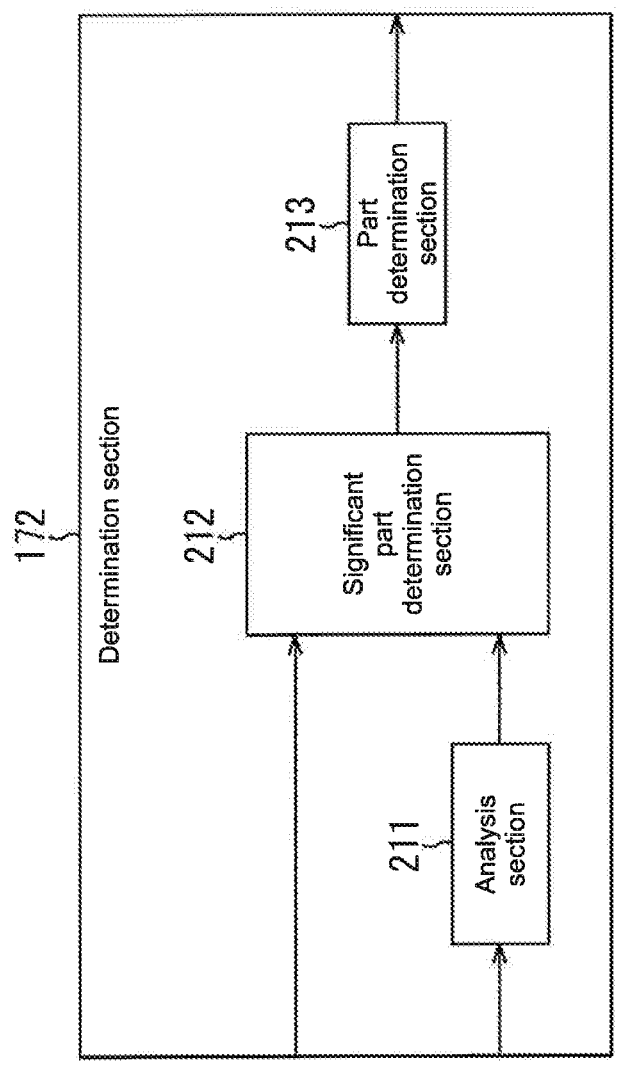
FIG. 22 is a block diagram showing an exemplary configuration of a determination section of FIG. 19.

FIG. 22 is a block diagram showing an exemplary configuration of the determination section 172 of FIG. 19.

The determination section 172 of FIG. 22 includes an analysis section 211, a significant part determination section 212, and a part determination section 213.

The analysis section 211 in the determination section 172 functions as a detection section, and generates a significance map based on program genre information in EPG (Electronic Program Guide) provided from the outside as an attribute signal, for example.

To be specific, images of news programs, variety shows, morning shows, and others are very likely to include subtitles, and a part for the subtitles may be estimated in advance. Therefore, when the program genre information is about a news program, a variety show, or a morning show, the analysis section 211 detects any part estimated as including subtitles, and regards the part as a part with a high level of significance. The analysis section 211 then generates a significance map indicating that pixels in the part are significant.

Sports programs have their own determined way for imaging, their own determined imaging angle, and others. As an example, at the imaging angle in use during a tennis match, the screen includes players respectively on the upper and lower portions. Accordingly, when the program genre information is about a tennis match, the analysis section 211 detects the part on the upper and lower portions on the screen as a part with a high level of significance. The analysis section 211 then generates a significance map indicating that pixels in the part are significant.

The significance map generated by the analysis section 211 is an image indicating the level of significance of each pixel, and the level of significance is represented by a value from 0 to 255. In this example, a larger pixel value means a higher level of significance. The analysis section 211 supplies the generated significance map to the significant part determination section 212.

Using Equation 8 below, the significant part determination section 212 determines a final significance map BlendSigMap(x, y) based on the maps, i.e., the significance map Map_sig(x, y) from the estimation section 195 of FIG. 20, and the significance map MetaSigMap(x, y) from the analysis section 211.

[Equation 8]

$$BlendSigMap(x, y) = W \times \text{Map\_sig}(x, y) + (1.0 - W) \times MetaSigMap(x, y) \quad 8$$

In Equation 8, the factor of "W" denotes a weighting factor, and takes a value between 0 and 1 inclusive.

The significant part determination section 212 binarizes the final significance map BlendSigMap(x, y), thereby generating a binary map BinSigMap(x, y). At this time, the significant part determination section 212 may use a median filter or a morphological filter as appropriate for removing isolated pixels.

The significant part determination section 212 detects, for use as a significant part, a rectangular part externally adjacent to any of the pixels having the value of 1 in the binary map BinSigMap(x, y), i.e., pixels in white. The significant part determination section 212 supplies information about the significant part to the part determination section 213.

Based on the significant part information, the part determination section 213 defines a central part in such a manner that the significant part in the central part on the screen comes within the viewer's central field of view. The significant part determination section 212 then calculates the central part ratio based on the defined central part. The central part ratio is then supplied to both the center generation section 13 and the periphery generation section 14 as the central part information.

(Exemplary Binary Map)

Figure 23:
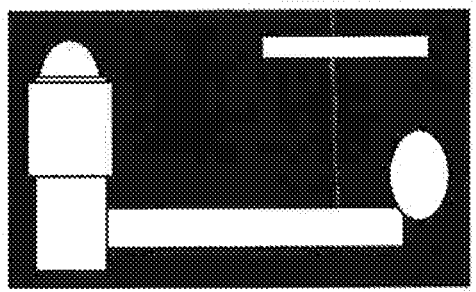
FIG. 23 is a diagram showing an exemplary binary map BinSigMap(x, y)

FIG. 23 is a diagram showing an exemplary binary map BinSigMap(x, y).

The significant part determination section 212 binarizes each pixel value in the final significance map BlendSigMap (x, y), i.e., the pixel value is set to 1 when the value exceeds a threshold value, and is set to 0 when the value does not exceed the threshold value. Accordingly, binarizing the final significance map BlendSigMap(x, y) of FIG. 21 leads to a binary map BinSigMap(x, y) of FIG. 23.

(Exemplary Significant Part)

Figure 24:
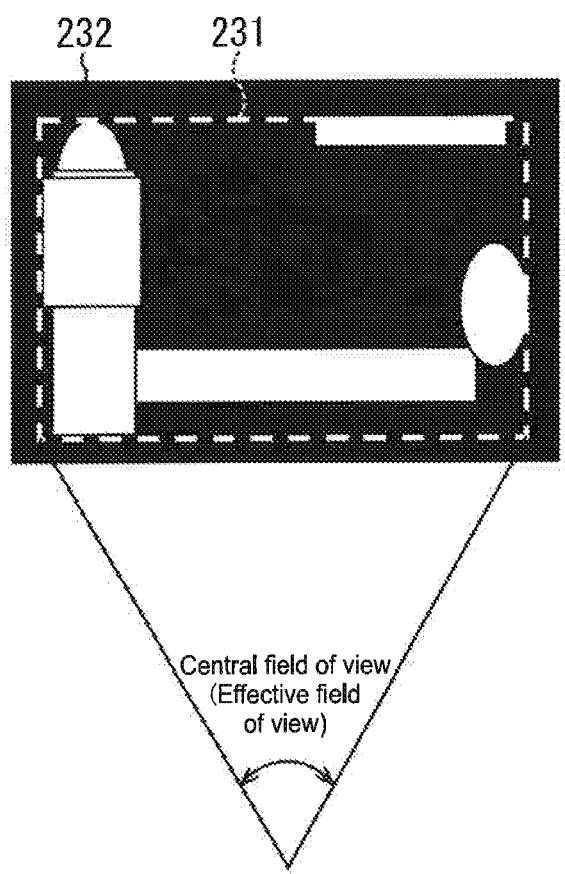
FIG. 24 is a diagram showing an exemplary significant part.

FIG. 24 is a diagram showing an exemplary significant part detected from the binary map BinSigMap(x, y) of FIG. 23.

As shown in FIG. 24, when the binary map BinSigMap(x, y) is the one shown in FIG. 23, a rectangular part 231 is detected as a significant part, which is externally adjacent to a white part where the pixel values are 1. As shown in FIG. 24, a central part 232 is then defined in such a manner that the rectangular part 231 therein comes within the viewer's central field of view.

Herein, the expression of "viewer's central field of view" means a part in the screen viewed by a viewer at the angle of ±30 degrees from a recommended viewing position, e.g., 1.5 times the height of the screen. The viewing position being the basis of the central field of view is not restricted to be the recommended viewing position, but may be a viewing position adjusted by the viewer, or a viewer's actual viewing position measured by a camera or a sensor that is not shown, for example.

(Description of Effect)

FIGS. 25A to 28C are each a diagram illustrating the effect produced by the image processing apparatus 170.

Figure 25A:
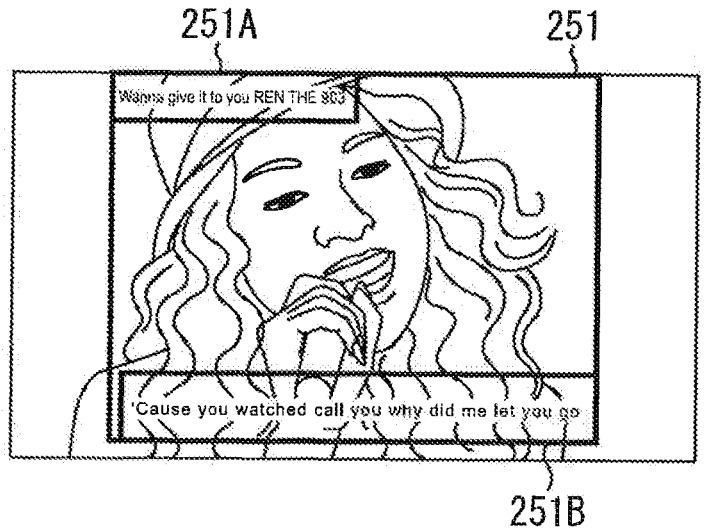
FIGS. 25A and 25B are diagrams illustrating the effect produced by the image processing apparatus.

As shown in FIG. 25A, when an input image includes subtitles at end portions thereof, the image processing apparatus 170 detects, as a significant part, a rectangular part 251 including subtitle parts 251A and 251B. This allows generation of a wide-view image in which the subtitle parts 251A and 251B are within the viewer's central field of view. This accordingly improves the viewability of the wide-view image.

On the other hand, for generating a wide-view image by simply scaling up an input image to the size of the screen, subtitles may exist beyond the viewer's central field of view, and this may make the subtitles difficult to view. Although not shown, this is applicable also to a case where subtitles exist at an end portion of the input image.

Figure 25B:
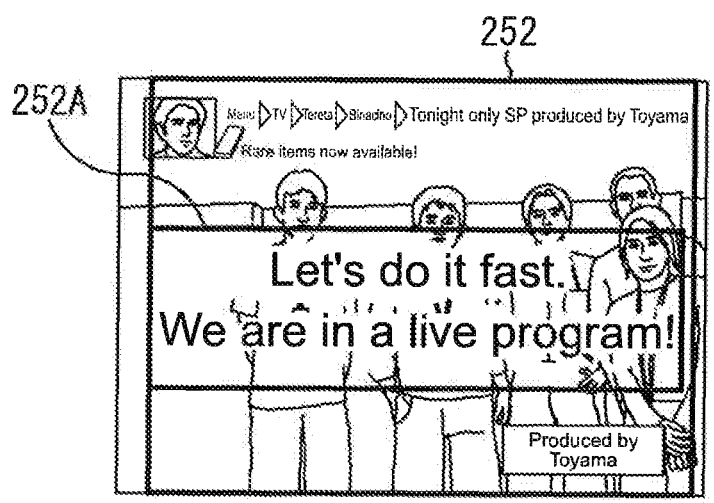

As shown in FIG. 25B, when an input image includes relatively large-sized subtitles at the center, i.e., subtitle part 252A, the image processing apparatus 170 detects, as a significant part, a rectangular part 252 including the subtitle part 252A. This allows generation of a wide-view image in which the subtitles are within the viewer's central field of view. This accordingly improves the viewability of the wide-view image.

On the other hand, for generating a wide-view image by simply scaling up an input image to the size of the screen, relatively large-sized subtitles may exist beyond the viewer's central field of view, and this may make the subtitles difficult to view.

When the images of FIGS. 25A and 25B are those of a news program, a variety show, or a morning show, the image processing apparatus 170 increases the pixel values in the significance map MetaSigMap(x, y). This accordingly gives priorities to the viewability of the subtitles in the images of the programs that are very likely to include the subtitles.

Figure 26B:
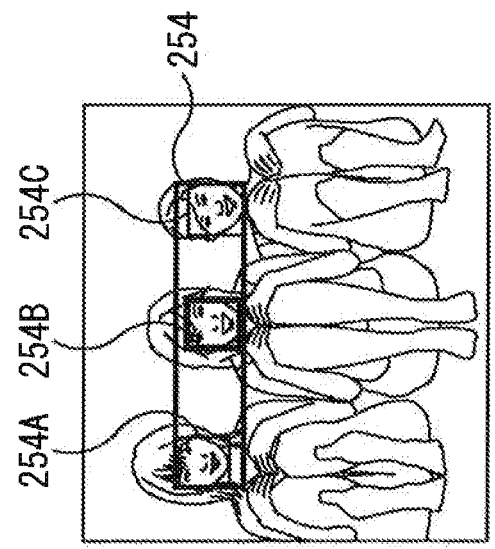
FIGS. 26A and 26B are diagrams illustrating the effect produced by the image processing apparatus.
Figure 26A:
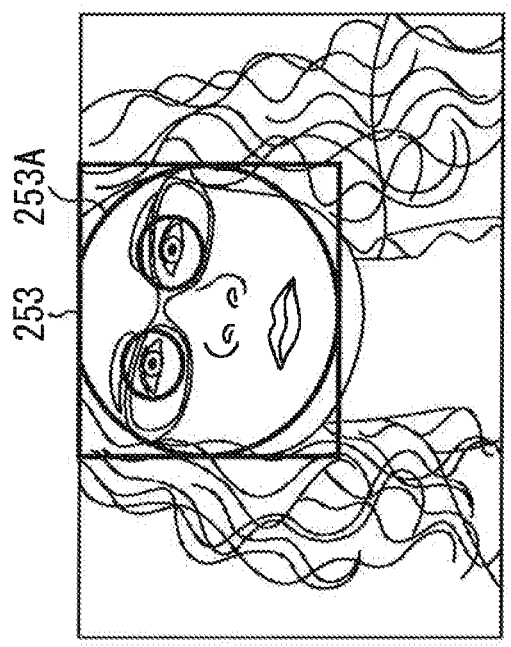

As shown in FIG. 26A, when an input image includes a zoomed-in human face, the image processing apparatus 170 detects, as a significant part, a rectangular part 253 including a face part 253A of the person. This allows generation of a wide-view image in which the face part 253A is within the viewer's central field of view. This accordingly improves the viewability of the wide-view image.

On the other hand, for generating a wide-view image by simply scaling up an input image to the size of the screen, the human face may exist beyond the viewer's central field of view, and the viewer thus has a difficulty in having a good grasp of the entire face.

As shown in FIG. 26B, when an input image includes three human faces, the image processing apparatus 170 detects, as a significant part, a rectangular part 254 including three face parts 254A to 254C of the three people. This allows generation of a wide-view image in which the face parts 254A to 254C are within the viewer's central field of view. This accordingly improves the viewability of the wide-view image.

On the other hand, for generating a wide-view image by simply scaling up an input image to the size of the screen, any of the three human faces may exist beyond the viewer's central field of view, and this may impair the viewability of the wide-view image.

As shown in FIG. 27A, when an input image includes people on both ends in the horizontal direction, the image processing apparatus 170 detects, as a significant part, a rectangular part 255 including human parts 255A to 255C. This allows generation of a wide-view image in which the human parts 255A to 255C are within a viewer's central field of view 255D. This accordingly improves the viewability of the wide-view image.

As shown in FIG. 27B, when an input image is the image of a program broadcasting a tennis match, and when there are players on upper and lower portions on the screen, the image processing apparatus 170 detects, as a significant part, a rectangular part 256 including human parts 256A and 256B, for example. This allows generation of a wide-view image in which the human parts 256A and 256B are within a viewer's central field of view 256D. This accordingly improves the viewability of the wide-view image.

On the other hand, for generating a wide-view image by simply scaling up an input image to the size of the screen, the people may exist beyond the viewer's central field of view, and this may result in a difficulty in immediately perceiving the people.

Figure 28A:
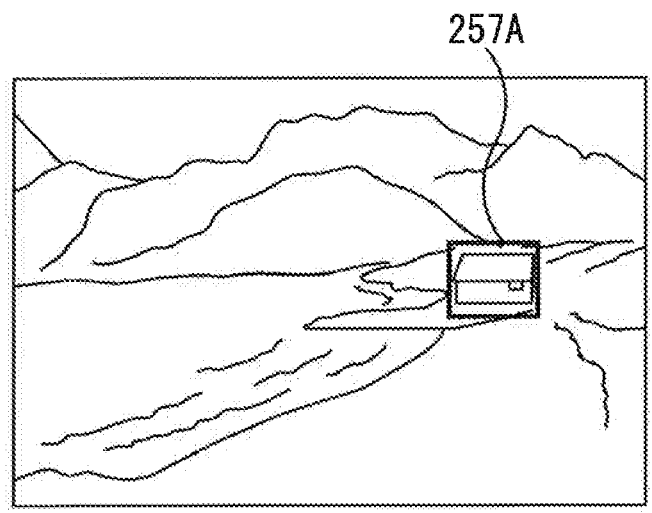
FIGS. 28A to 28C are diagrams illustrating the effect produced by the image processing apparatus.
Figure 28B:
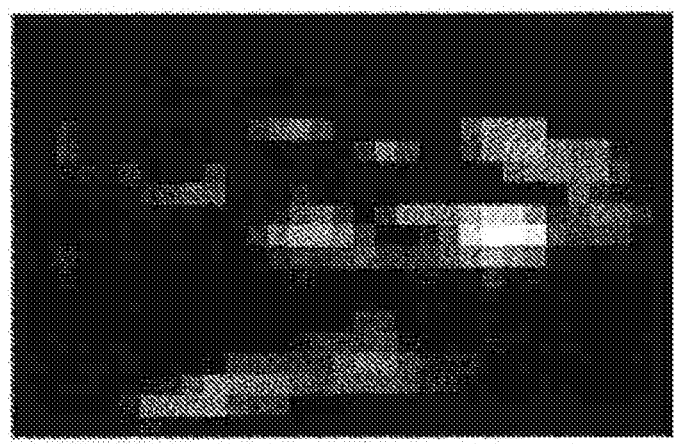
Figure 28C:
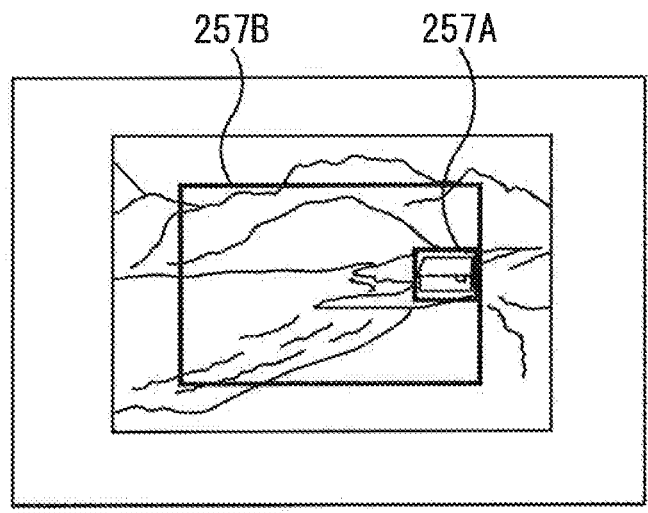

As shown in FIG. 28A, when an input image includes a house being a main object on the right side, as shown in FIG. 28B, the image processing apparatus 170 generates an object map in which a part 257A of the house shows the largest pixel value. As a result, the part 257A is detected as a significant part, and as shown in FIG. 28C, a wide-view image is so generated that the part 257A comes within a viewer's central field of view 257B. This accordingly improves the viewability of the wide-view image.

On the other hand, for generating a wide-view image by simply scaling up an input image to the size of the screen, the house may exist beyond the viewer's central field of view, and this may impair the viewability of the wide-view image.

(Description of Processing of Image Processing Apparatus)

Figure 29:
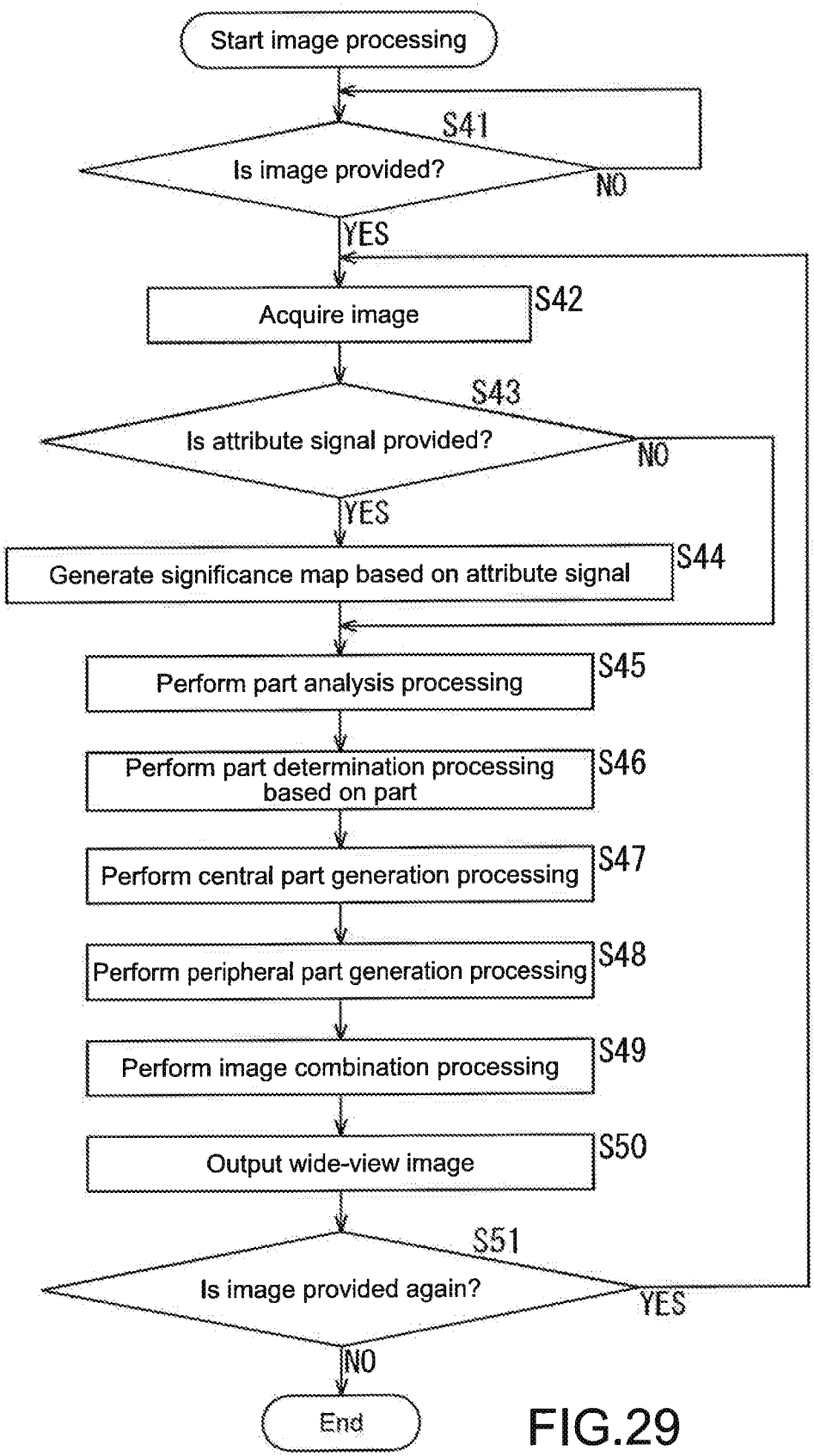
FIG. 29 is a flowchart of image processing by the image processing apparatus of FIG. 19.

FIG. 29 is a flowchart of image processing by the image processing apparatus 170 of FIG. 19.

Processes from steps S41 to S43 of FIG. 29 are similar to those from steps S11 to S13 of FIG. 18, and thus are not described again.

In step S43, when the assessment is made that an attribute signal is provided from the outside, in step S44, the analysis section 211 in the determination section 172 (FIG. 22) generates a significance map based on the program genre information provided from the outside as the attribute signal. The procedure then goes to step S45.

On the other hand, when the assessment in step S43 is made that no attribute signal is provided from the outside, the procedure goes to step S45.

In step S45, the analysis section 171 performs part analysis processing of generating another significance map by detecting parts in the image, i.e., a subtitle part, a face part, a human part, and an object part. The analysis section 171 supplies the generated significance map to the determination section 172.

In step S46, the determination section 172 determines a final significance map based on the significance maps, i.e., the one provided by the analysis section 171, and the one generated by the analysis section 211, thereby performing the part determination processing based on the part for determining the central part ratio CentralPartRatio. The determination section 172 supplies the determined central part ratio CentralPartRatio to both the center generation section 13 and the periphery generation section 14 as central part information.

Processes from steps S47 to S51 are similar to those from steps S17 to S21 of FIG. 18, and thus are not described again.

As described above, the image processing apparatus 170 generates an image of a central part by performing scaling processing on an input image based on a significance map, and then generates an image of a peripheral part by extrapolation of the input image. The image processing apparatus 170 then combines the image of the central part and the image of the peripheral part, so that a wide-view image is generated.

Therefore, with no use of information about viewer's part designation, detection results of various sensors, or others, the scaling processing is performed for a high-significance-level part in the central part to be positioned within a viewer's central field of view, so that the resulting wide-view image is with better viewability. That is, a wide-view image to be generated is appropriate to the level of significance of the image. Accordingly, the resulting wide-view image is with better viewability.

Compared with the case of scaling up an input image to the size of the screen, the scale factor for the input image in this case is reduced. Therefore, the resulting wide-view image is less blurred.

In the second embodiment, the center of the central part is the center of the screen, but the center of the central part may not necessarily be the center of the screen.

Figure 30B:
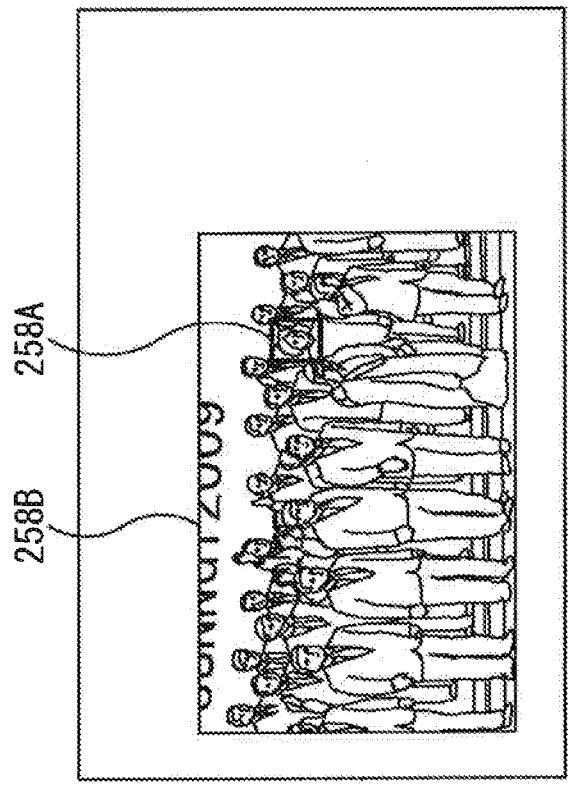
FIGS. 30A and 30B are diagrams showing an exemplary position change of a central part.
Figure 30A:
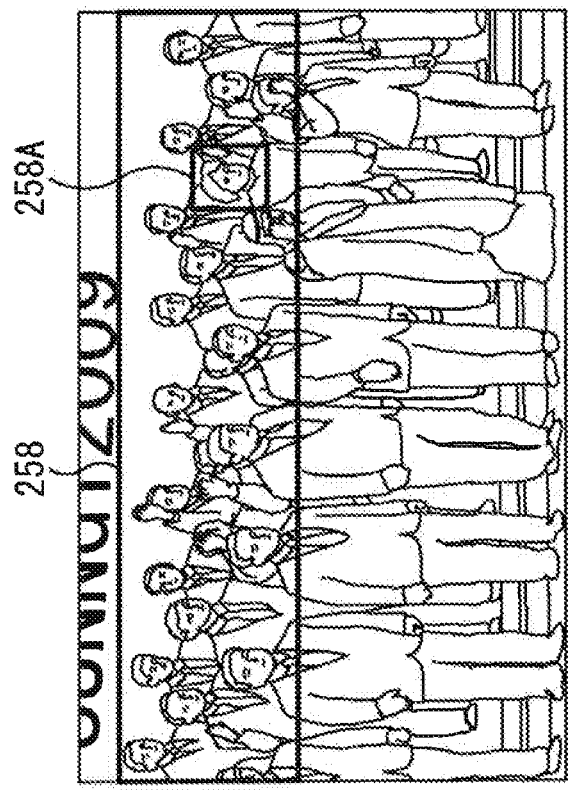

For example, as shown in FIG. 30A, when a person to whom a viewer directs his/her attention in an input image is on the right side of the screen, the image processing apparatus 170 detects a rectangular part 258 including his/her face part 258A as a significant part. The image processing apparatus 170 then defines a central part 258B by size in such a manner that the significant part in the central part 258B comes within the viewer's central field of view. At this time, alternatively, the image processing apparatus 170 may change the position of the central part 258B in such a manner that the face part 258A in the central part 258B comes within the vicinity of the center of the viewer's central field of view as shown in FIG. 30B.

Although not shown, the central part may be changed in position in such a manner that the human part of the person receiving the viewer's attention comes within the vicinity of the center of the viewer's central field of view.

Third Embodiment

Exemplary Configuration of Image Processing Apparatus in Third Embodiment

Figure 31:
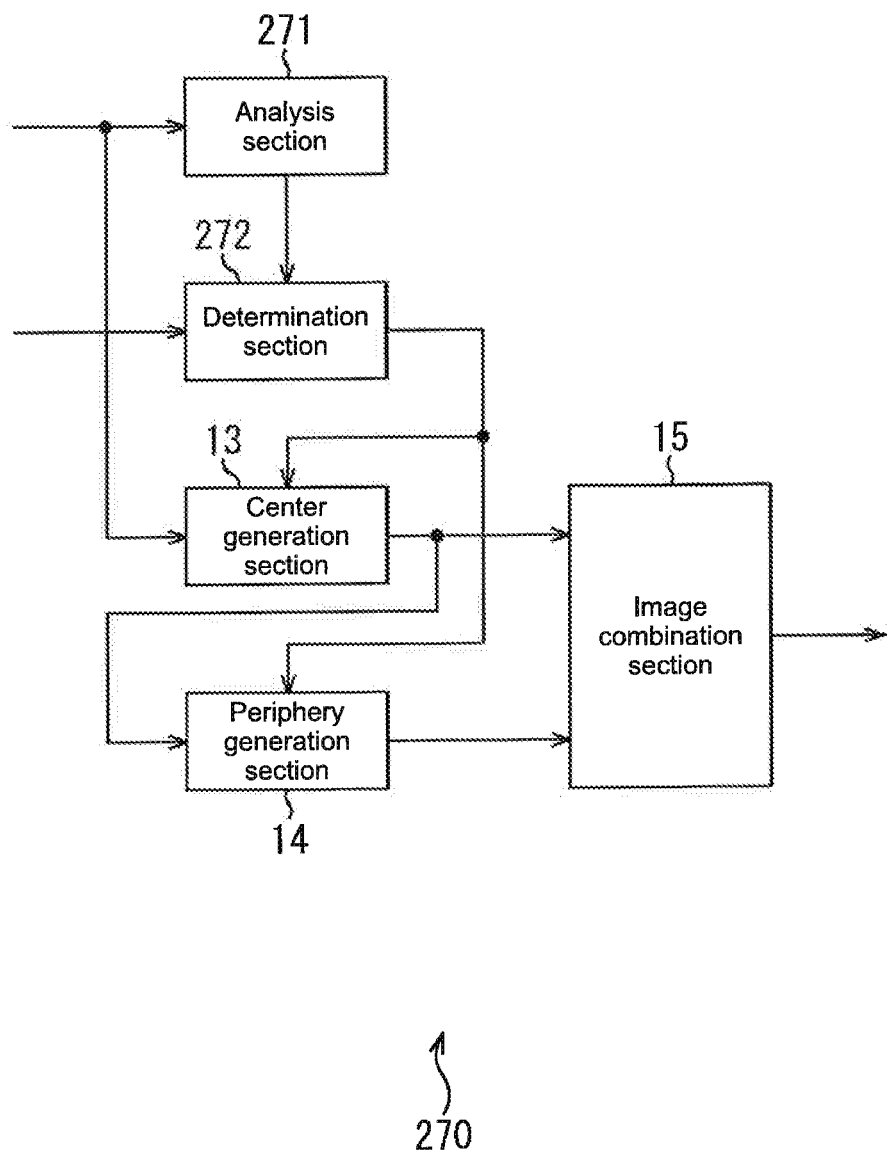
FIG. 31 is a block diagram showing an exemplary configuration of an image processing apparatus in a third embodiment with the application of the present disclosure.

FIG. 31 is a block diagram showing an exemplary configuration of an image processing apparatus in a third embodiment with the application of the present disclosure.

In the configuration of FIG. 31, any component similar to that of FIG. 1 is provided with the same reference numeral, and may not be described again as appropriate if it is already described.

Unlike the image processing apparatus 10 of FIG. 1, an image processing apparatus 270 of FIG. 31 includes an analysis section 271 as an alternative to the analysis section 11, and a determination section 272 as an alternative to the determination section 12. The image processing apparatus 270 defines a scale factor Scale not based on the image quality of an input image but based on a scene, which is used as characteristics of the input image.

The analysis section 271 classifies scenes of an input image. Based on the classified scenes, the analysis section 271 identifies a level of wide-angle suitability indicating how suitable the scene is for wide-angle display of the input image. The identified level of wide-angle suitability is supplied to the determination section 272.

The determination section 272 identifies a final level of wide-angle suitability based on the level of wide-angle suitability provided by the analysis section 271, and an attribute signal indicating the attribute of the input image. The determination section 272 defines a central part based on the final level of wide-angle suitability, and supplies information about the central part to both the center generation section 13 and the periphery generation section 14.

(Exemplary Configuration of Analysis Section)

Figure 32:
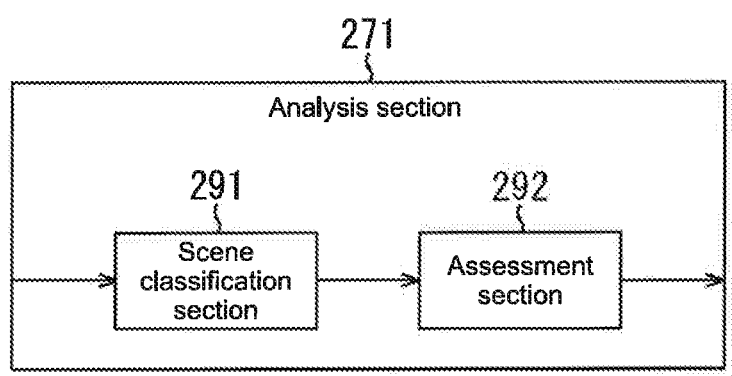
FIG. 32 is a block diagram showing an exemplary configuration of an analysis section of FIG. 31.

FIG. 32 is a block diagram showing an exemplary configuration of the analysis section 271 of FIG. 31.

The analysis section 271 of FIG. 32 includes a scene classification section 291, and an assessment section 292.

The scene classification section 291 in the analysis section 271 performs scene classification processing on an input image. For this scene classification processing, there is a technique described in "Natural images classification by multiple pixel analysis", F. NACCAF, ICCE. 2005, for example.

The types of scenes to be classified by the scene classification processing include macro shooting, portrait shooting, zoom-in shooting, deep focus imaging, and others. The scene classification section 291 supplies scene information to the assessment section 292. This scene information is the one obtained as a result of the scene classification processing, and representing scenes of the input image. Alternatively, the scene classification section 291 may classify the scenes of the input image based on the program genre information in EPG, for example.

The assessment section 292 assesses whether the input image is suitable for wide-angle display based on the scene information provided by the scene classification section 291. The assessment section 292 then provides a value between 0 and 1 inclusive to a level of wide-angle suitability.

As an example, when the scene information is about a scene of close-range view with a shallow depth of field, e.g., macro shooting scene, portrait shooting scene, and zoom-in shooting scene, the assessment section 292 assesses that the input image is not suitable for wide-angle display, thereby providing a value close to 0 to the level of wide-angle suitability.

On the other hand, when the scene information is about a scene of far-range view such as deep focus imaging scene, e.g., scene of nature view, the assessment section 292 assesses that the input image is suitable for wide-angle display, and provides a value close to 1 to a level of wide-angle suitability. The assessment section 292 then supplies the level of wide-angle suitability to the determination section 272 of FIG. 31.

(Exemplary Configuration of Determination Section)

Figure 33:
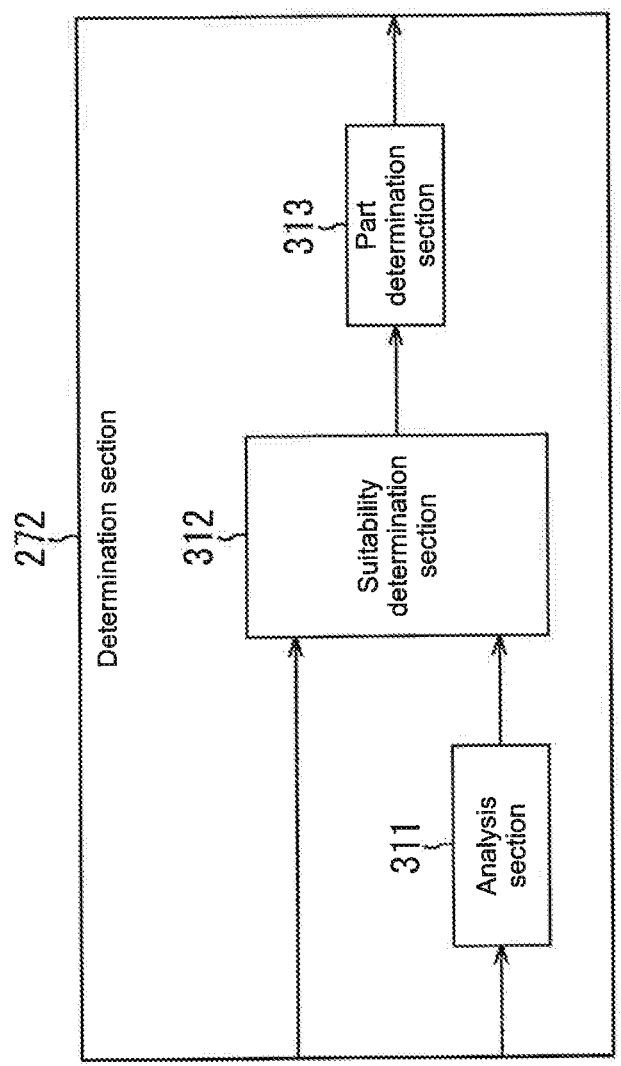
FIG. 33 is a block diagram showing an exemplary configuration of a determination section of FIG. 31.

FIG. 33 is a block diagram showing an exemplary configuration of the determination section 272 of FIG. 31.

The determination section 272 of FIG. 33 includes an analysis section 311, a suitability determination section 312, and a part determination section 313.

The analysis section 311 in the determination section 272 identifies a level of wide-angle suitability of an input image based on imaging information provided from the outside as an attribute signal. The imaging information is about the input image when it is captured, including a focal length, an aperture (F number), distance-measurement information by a depth sensor or others, the lens type, and others.

To be specific, the analysis section 311 determines that the input image is obtained by wide-angle shooting when the imaging information indicates a relatively short focal length, a relatively large F value, a wide-angle lens, and others, i.e., when the depth of field is deep. The analysis section 311 then provides a value close to 1 to a level of wide-angle suitability. When the imaging information indicates distance-measurement information of a relatively long distance, the analysis section 311 determines that the input image is suitable for wide-angle display, thereby providing a value close to 1 to a level of wide-angle suitability.

On the other hand, when the imaging information does not indicate the above, the analysis section 311 provides a value close to 0 to a level of wide-angle suitability. The analysis section 311 then supplies the level of wide-angle suitability to the suitability determination section 312.

The suitability determination section 312 identifies a final level of wide-angle suitability Final_WideFactor using Equation 9 below based on the level of wide-angle suitability Image_WideFactor from the assessment section 292 of FIG. 32, and the level of wide-angle suitability Meta_WideFactor from the analysis section 311.

[Equation 9]

$$\text{Final\_WideFactor} = \text{w\_image} \times \text{Image\_WideFactor} + (1.0 - \text{w\_image}) \times \text{Meta\_WideFactor} \quad 9$$

In Equation 9, the factor of "w_image" denotes a weighting factor, and takes a value between 0 and 1 inclusive.

The suitability determination section 312 supplies the final level of wide-angle suitability Final_WideFactor to the part determination section 313.

The part determination section 313 defines a central part so as to be larger with an increase of the final level of wide-angle suitability Final_WideFactor. The part determination section 313 supplies the central part ratio CentralPartRatio of the determined central part to both the center generation section 13 and the periphery generation section 14 of FIG. 31 as central part information.

(Description of Effect)

FIGS. 34A to 35B are diagrams illustrating the effect by the image processing apparatus 270.

Figure 34B:
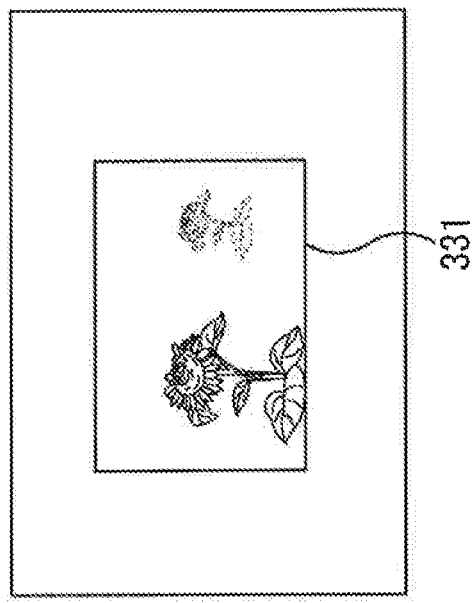
FIGS. 34A and 34B are diagrams illustrating the effect produced by the image processing apparatus.
Figure 34A:
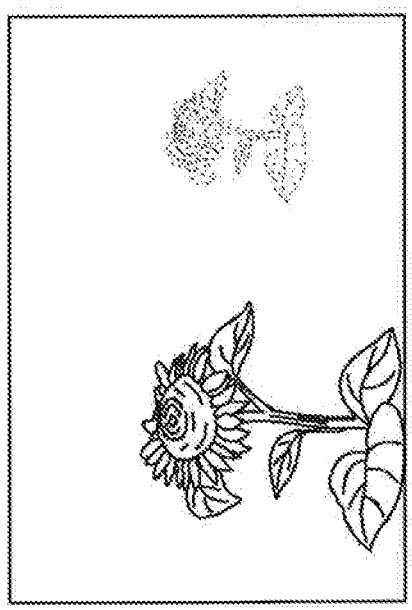

When the scene of an input image is obtained by macro shooting as shown in FIG. 34A, the image processing apparatus 270 provides a value close to 0 to the final level of wide-angle suitability Final_WideFactor. This accordingly leads to a relatively small central part 331 as shown in FIG. 34B. Therefore, in a wide-view image of the macro-shooting scene, this prevents an in-focus object part from being out of a viewer's central field of view, thereby improving the viewability.

Alternatively, using imaging information, the image processing apparatus 270 may move the center of the central part from the center of the screen so as to include the in-focus object part within the viewer's central field of view.

On the other hand, for generating a wide-view image by simply scaling up an input image to the size of the screen, the image of an object is out of focus in the viewer's central field of view, thereby resulting in a difficulty in immediately perceiving the object.

Figure 35B:
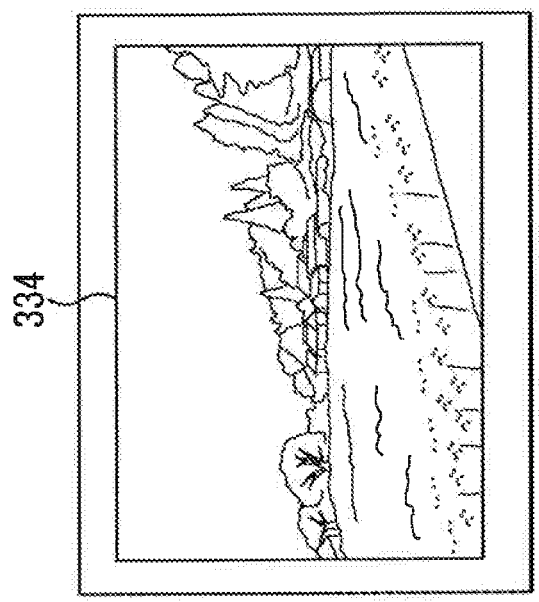
FIGS. 35A and 35B are diagrams illustrating the effect produced by the image processing apparatus.
Figure 35A:
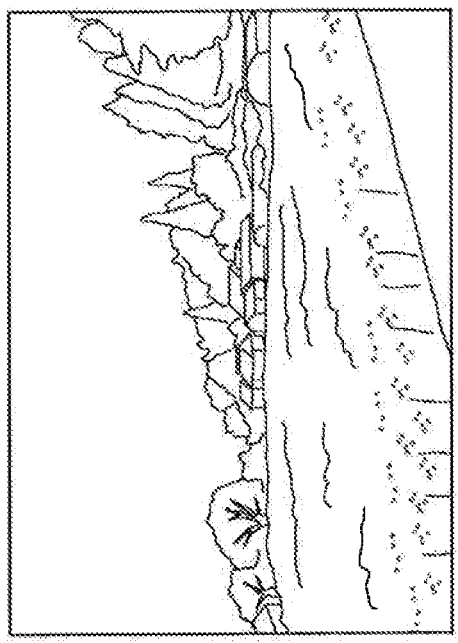

When the scene of an input image is obtained by deep focus imaging as shown in FIG. 35A, the image processing apparatus 270 provides a value close to 1 to the final level of wide-angle suitability Final_WideFactor. This accordingly leads to a relatively large central part 334 as shown in FIG. 35B. Therefore, with a wide-view image of the deep-focus-imaging scene suitable for wide-angle display, a viewer may feel spaciousness, so that the sense of realism is improved.

(Description of Processing by Image Processing Apparatus)

Figure 36:
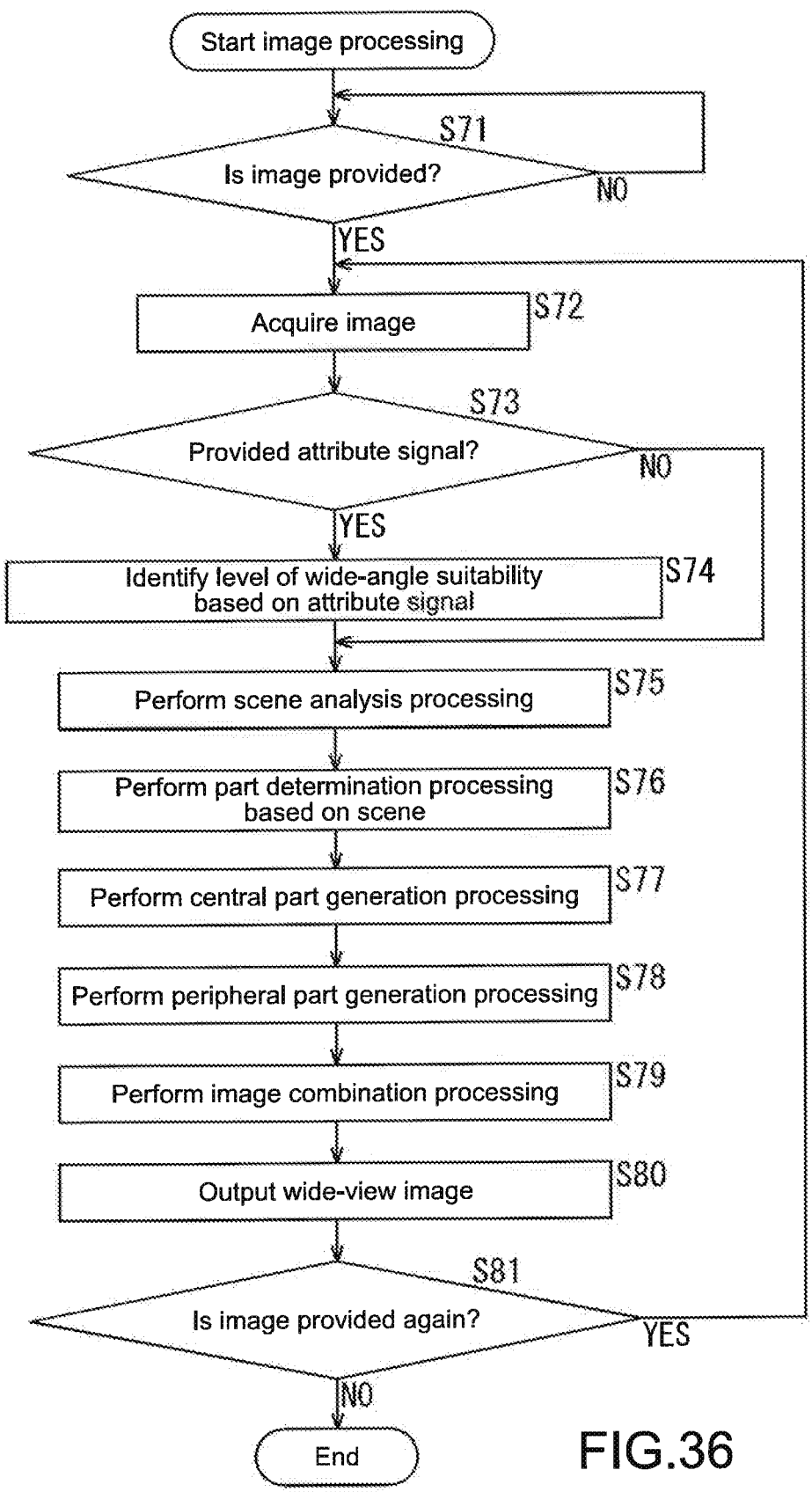
FIG. 36 is a flowchart of image processing by the image processing apparatus of FIG. 31.

FIG. 36 is a flowchart of image processing by the image processing apparatus 270 of FIG. 31.

Processes from steps S71 to S73 of FIG. 36 are similar to those from steps S11 to S13 of FIG. 18, and thus are not described again.

In step S73, when the assessment is made that an attribute signal is provided from the outside, in step S74, the analysis section 311 in the determination section 272 (FIG. 33) identifies a level of wide-angle suitability based on imaging information provided from the outside as the attribute signal. The procedure then goes to step S75.

On the other hand, when the assessment in step S73 is made that no attribute signal is input yet from the outside, the procedure goes to step S75.

In step S75, the analysis section 271 performs scene classification processing on an input image, thereby performing scene analysis processing of identifying another level of wide-angle suitability. The analysis section 271 then supplies the identified wide-angle suitability to the determination section 272.

In step S76, the determination section 272 identifies a final level of wide-angle suitability based on the level of wide-angle suitability from the analysis section 271, and the level of wide-angle suitability identified by the analysis section 311, thereby performing part determination processing based on the scene of determining the central part ratio CentralPartRatio. The determination section 272 supplies the determined central part ratio CentralPartRatio to both the center generation section 13 and the periphery generation section 14 as central part information.

Processes from steps S77 to S81 are similar to those from steps S17 to S21 of FIG. 18, and thus are not described again.

As described above, the image processing apparatus 270 generates an image of a central part by performing scaling processing on an input image based on a level of wide-angle suitability, and generates an image of a peripheral part by extrapolation of the input image. The image processing apparatus 270 then generates a wide-view image by combining the image of the central part and the image of the peripheral part.

Therefore, with no use of information about viewer's part designation, detection results of various sensors, or others, this allows generation of a wide-view image with spaciousness by generating an image of a central part being large relative to an image suitable for wide-angle display. That is, this allows generation of a wide-view image suitable for scenes of the input image, whereby the wide-view image is with a better sense of realism.

Note that, in the first to third embodiments, information for use to define the scale factor Scale is the quality of an input image, a level of significance, or a scene, but this is not restrictive.

Figure 37A:
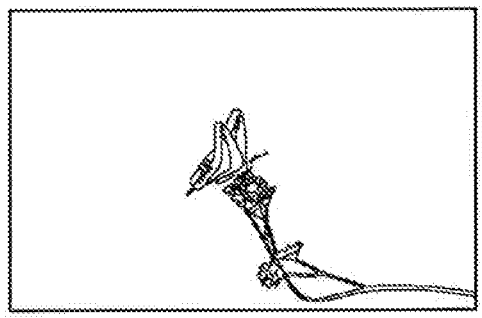
FIGS. 37A to 37C are diagrams illustrating how a scale factor is defined based on an image composition.

Alternatively, the scale factor Scale may be defined based on the composition of an input image. If this is the case, when an input image is in the composition of including a main object right in the center (hereinafter, referred to as "centered composition") as exemplarily shown in FIG. 37A, the scale factor Scale may be the ratio of the size of a wide-view image to the size of the input image (hereinafter, this is referred to as full scaling). That is, when an input image is in the centered composition, an object exists in the center of the input image, so that the input image is simply scaled up to the size of the screen.

Figure 37B:
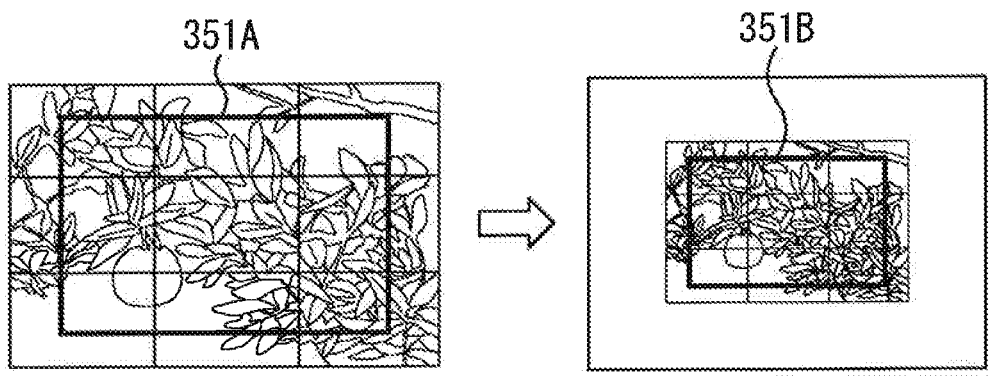
Figure 37C:
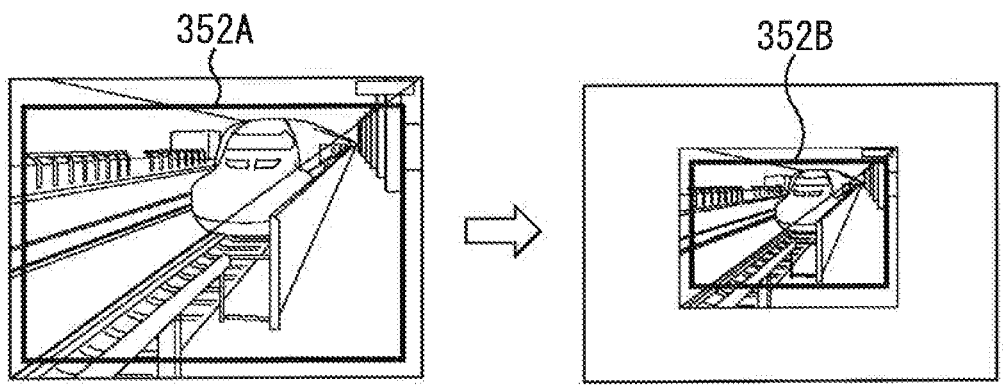

On the other hand, when an input image is in the composition of the rule of thirds as shown in FIG. 37B, or is in the composition of the diagonal method as shown in FIG. 37C, a significant part to be defined is a part 351A (352A) including the part of a main object, e.g., orange in FIG. 37B or Shinkansen in FIG. 37C, with which a viewer may understand the composition. The scale factor Scale is then so defined as to include the significant part within a central field of view 351B (352B).

That is, when the input image is in the composition of the rule of thirds or the diagonal method, the intention of a person who captured the image lies in moving a viewer's line of sight from the center of the image. However, the viewer may not know the intention unless he/she grasps the composition of the image. This is the reason why the part 351A (352A) allowing perception of the composition is positioned within the central field of view 351B (352B).

On the other hand, for generating a wide-view image by simply scaling up an input image to the size of the screen, the input image is scaled up to the size of the screen. The viewer thus has a difficulty in grasping the composition in its entirety, thereby resulting in a difficulty in understanding the intention of the person who captured the image.

When the scale factor Scale is defined based on the composition of an input image, alternatively, the composition of the input image may be used as a basis to move the center of the central part and the peripheral part from the center of the screen.

Figure 38B:
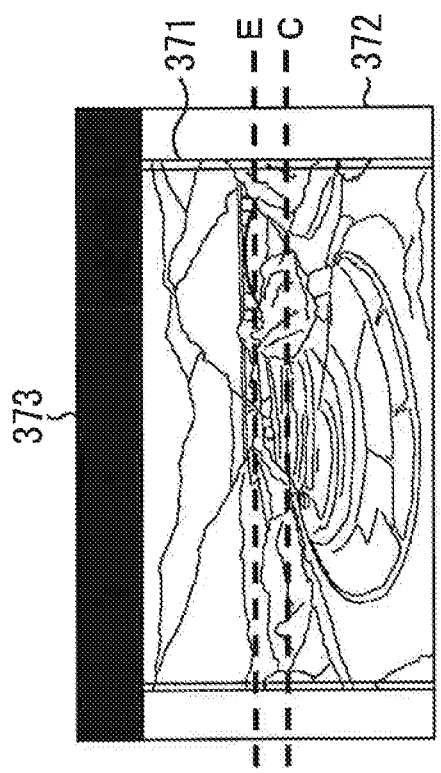
FIGS. 38A and 38B are diagrams illustrating how a scale factor is defined based on an image composition.
Figure 38A:
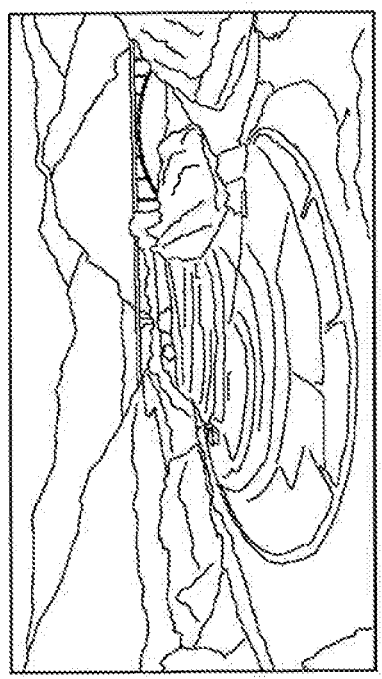

As an example, when an input image is in the bird's-eye view composition as exemplarily shown in FIG. 38A, alternatively, the vertical center of a central part 371 and a peripheral part 372, i.e., position C, may be moved to be lower than the vertical center of a viewer's line of sight, i.e., eye level E. In this case, an upper part 373 of the screen is left vacant, and a black image is disposed thereto. As a result, the upper field of view is reduced, and the center of the resulting wide-view image is moved downward, so that the viewer feels more like looking down.

Figure 39B:
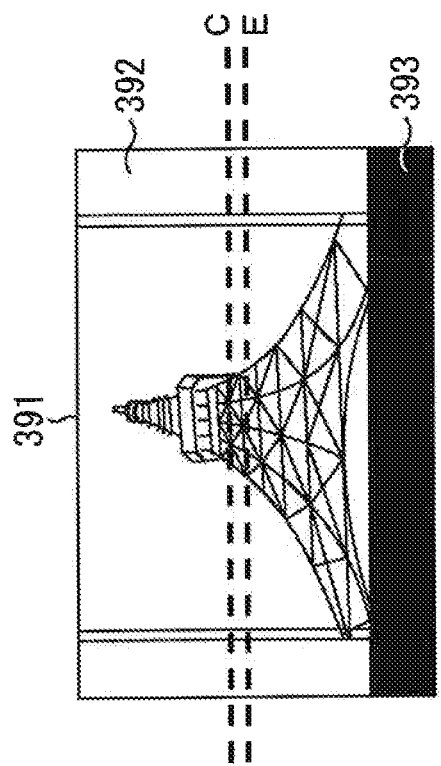
FIGS. 39A and 39B are diagrams illustrating how a scale factor is defined based on an image composition.
Figure 39A:
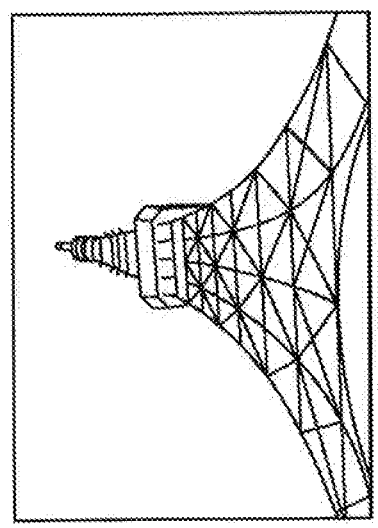

Still alternatively, as exemplarily shown in FIG. 39A, when an input image is in the triangular composition (optical-axis-tilting scene), the vertical center of a central part 391 and a peripheral part 392, i.e., position C, may be moved to be upper than the eye level E. In this case, a lower part 393 of the screen is left vacant, and a black image is disposed thereto. As a result, the lower field of view is reduced, and the center of the resulting wide-view image is moved upward, so that the viewer feels more like looking up. Herein, the eye level E may be set in advance, or may be detected by a sensor or others that are not shown.

Figure 40B:
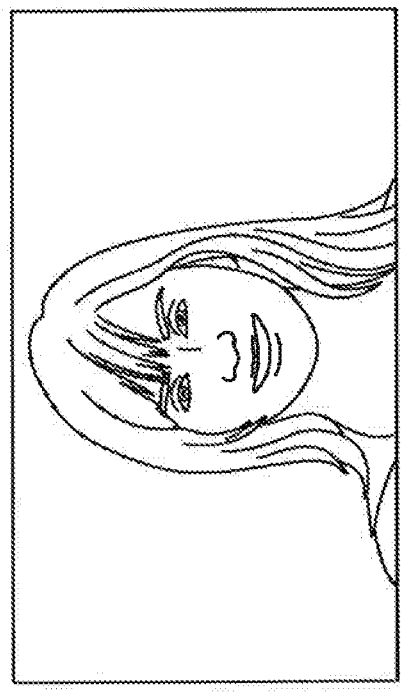
FIGS. 40A and 40B are diagrams illustrating how a central part is defined based on a real size.
Figure 40A:
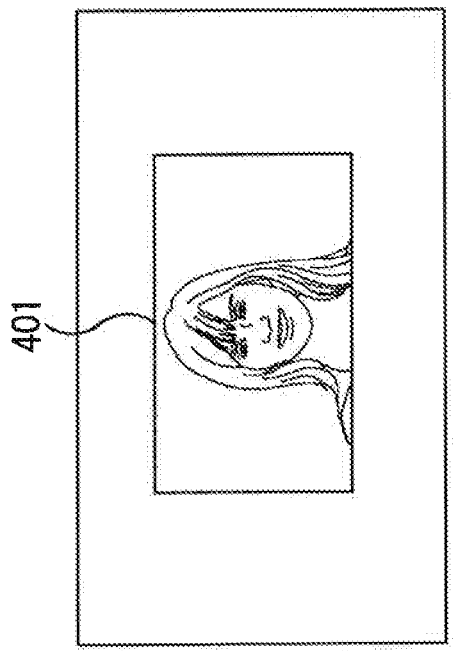
Figure 41B:
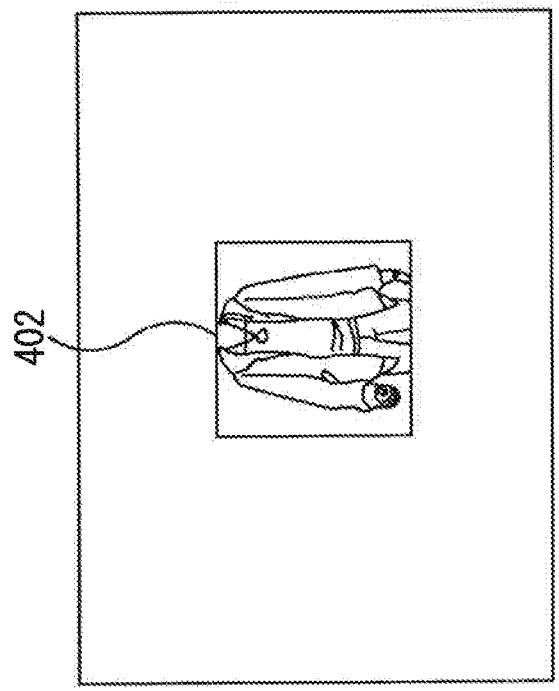
FIGS. 41A and 41B are diagrams illustrating how a central part is defined based on a real size.
Figure 41A:
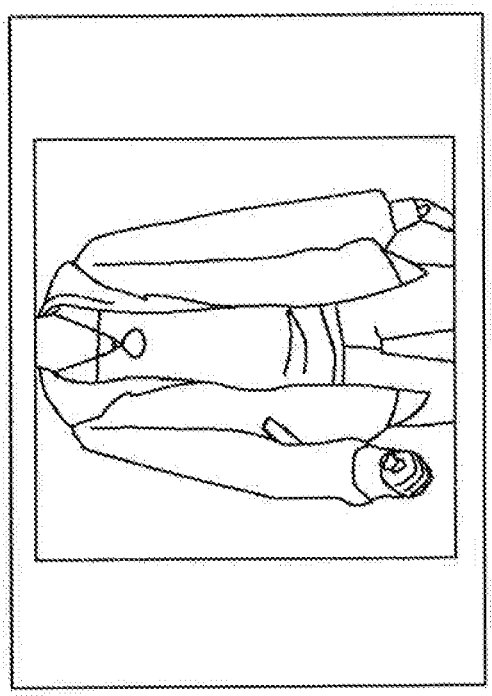

Still alternatively, when an input image is of a videophone or others for interaction with an object as shown in FIG. 40A, or when an input image is of an object being a product item as shown in FIG. 41A, a central part 401 (402) may be so defined as to display the object in real size as shown in FIG. 40B or 41B. In this case, the size of the object in a wide-view image is the real size, thereby improving the sense of realism and the realistic effects. Herein, the real size of the object is provided from the outside as meta information of the input image, for example.

On the other hand, for generating a wide-view image by simply scaling up an input image to the size of the screen, product items or others are scaled up to the size of the screen, thereby resulting in a difficulty in grasping the real size of the product items or others.

Moreover, as shown in FIGS. 42A and 42B, when an input image is a letterboxed image or a pillarboxed image, the image processing apparatus 10 (170, 270) may perform image processing on the image after deleting black bars on the upper and lower or on the right and left portions thereof, thereby being able to generate a wide-view image with no black bar. Herein, a central part may be so defined as to entirely include the black-bar-deleted image within the central field of view.

As shown in FIG. 43A, when an input image is with sidebars including characters, a wide-view image may be so generated as to include the entire input image, i.e., part 411A, within a central field of view 411B.

Further, as shown in FIG. 43B, when an input image includes sidebars of artificial images, a wide-view image may be so generated as to include the remaining part of the input image without the sidebars, i.e., part 412A, within a central field of view 412B.

Still further, as shown in FIG. 44A, when an input image is of an object moving from left to right and is captured with the panning technique as shown in FIG. 44B, a central part 431 may be moved on the screen from left to right based on a motion vector of the input image. In this case, a viewer's line of sight is moved in response to the movement of the object so that he may grasp the spatial position of the object. Therefore the sense of realism may be improved.

Figures 45A, 45B:
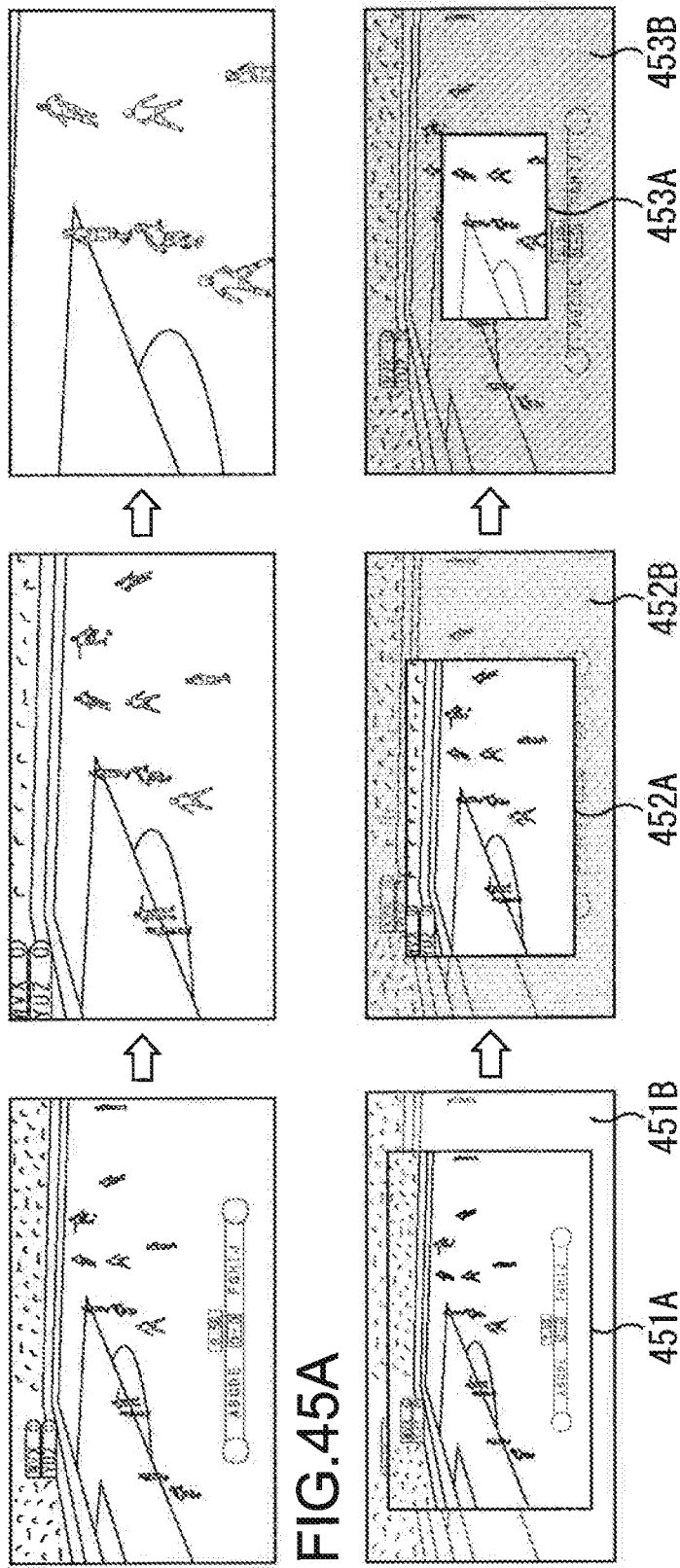
FIGS. 45A and 45B are diagrams illustrating image processing on an image captured with the zoom-in technique.

Still further, as shown in FIG. 45A, when an input image is captured with the zoom-in technique, as shown in FIG. 45B, a central part therein may be reduced in size without changing the size of an object therein with the passage of time, i.e., in central parts 451A to 453A. That is, the central parts 451A to 453A may be reduced in size one after the other.

In this case, as shown in FIG. 45B, images of peripheral parts not overlapped with the central parts 451A to 453A, i.e., peripheral parts 451B to 453B, are gradually reduced in intensity component or are more blurred. As a result, because the peripheral field of view (induced field of view, auxiliary field of view) is gradually reduced, the viewing angle is narrowed, so that a viewer feels like staring at the object.

Herein, how an input image is captured, i.e., by the panning or zoom-in technique, may be estimated based on a motion vector of the input image included in decoding information of an MPEG stream therein, for example.

Alternatively, the motion vector of an input image included in decoding information of an MPEG stream therein may be used as a basis to define the scale factor Scale. In this case, a central part is defined to be smaller with an increase of the motion vector, thereby defining the scale factor Scale, for example. This accordingly prevents a motion vector from becoming too large in the resulting wide-view image even if the input image is scaled up, so that a viewer is protected from visually induced motion sickness.

[Conclusion]

FIG. 46 is a diagram showing image processing according to the embodiments of the present disclosure, and the effect thereof.

As shown in FIG. 46, the image processing apparatus 10 analyzes the band distribution of an input image based on header information of an MPEG stream therein, and defines the size of a central part based on the band distribution, i.e., the band distribution being on the lower-frequency side, the smaller the size of the central part. The band distribution being on the lower-frequency side leads to a scale factor lower than that for full scaling. Therefore, the resulting wide-view image is prevented from being blurred, thereby improving the realistic effects.

Further, the image processing apparatus 10 measures an amount of compressive strain in an input image based on bit rate information and decoding information of an MPEG stream therein, and defines the size of a central part based on the amount of compressive strain, i.e., the larger the amount of compressive strain, the smaller the size of the central part is. The larger amount of compressive strain leads to a scale factor lower than that for full scaling. Therefore, in the resulting wide-view image, the compressive strain is prevented from being noticeable, thereby improving the realistic effects.

Still further, the image processing apparatus 10 measures an amount of noise in an input image based on information about a camera used to capture the input image, and defines the size of a central part based on the amount of noise, i.e., the larger the amount of noise, the smaller the size of the central part is. The larger amount of noise leads to a scale factor lower than that for full scaling. Therefore, in the resulting wide-view image, the noise is prevented from being noticeable, thereby improving the realistic effects.

Still further, the image processing apparatus 10 measures a quantization step size in an input image based on information in an MPEG stream therein, and defines the size of a central part based on the quantization step size, i.e., the larger the quantization step size, the smaller the size of the central part is. The larger quantization step size leads to a scale factor lower than that for full scaling. Therefore, in the resulting wide-view image, the low image quality is prevented from being noticeable, thereby improving the realistic effects.

The image processing apparatus 170 detects a subtitle part from an input image based on OSD information, and defines the size of a central part so as to include the subtitle part within a central field of view. This leads to a scale factor basically lower than that for full scaling. With the subtitle part being within the central field of view in the resulting wide-view image, the viewability is prevented from being impaired because the subtitles may not exist beyond the central field of view even if the input image is scaled up. Accordingly, the wide-view image is with better viewability.

Further, the image processing apparatus 170 detects a face part from an input image, and defines the size of a central part so as to include the face part within a central field of view. This leads to a scale factor basically lower than that for full scaling. With the face part being within the central field of view in the resulting wide-view image, the viewability is prevented from being impaired and a viewer may not feel oppressed because the face(s) may not exist beyond the central field of view even if the input image is scaled up. Accordingly, the wide-view image is with better realistic effects and viewability.

Still further, the image processing apparatus 170 detects a human part from an input image, and defines the size of a central part so as to include the human part within a central field of view. This leads to a scale factor basically lower than that for full scaling. With the human part being within the central field of view in the resulting wide-view image, the viewability is prevented from being impaired because the people may not exist beyond the central field of view even if the input image is scaled up. Accordingly, the wide-view image is with better viewability.

At this time, the central part may be moved in such a manner that the human part of a person receiving a viewer's attention comes in the vicinity of the center thereof. If this is the case, a specific person receiving the viewer's attention is positioned at the center of the central part, so that the resulting wide-view image is with much better viewability. Herein, the specific person receiving the viewer's attention is designated by the viewer, for example.

Still further, the image processing apparatus 170 detects an object part from an input image based on viewer's designation, and defines the size of a central part so as to include the object part within a central field of view. This leads to a scale factor basically lower than that for full scaling. With the object part being within the central field of view in the resulting wide-view image, the viewability is prevented from being impaired because the main object may not exist beyond the central field of view even if the input image is scaled up. Accordingly, the wide-view image is with better viewability.

Still further, the image processing apparatus 170 estimates a part with a high level of significance in an input image based on a program genre found in program genre information in EPG, and defines the size of a central part so as to include the high-significance-level part within a central field of view. This leads to a scale factor basically lower than that for full scaling. With the high-significance-level part for the program genre being within the central field of view in the resulting wide-view image, the viewability is accordingly improved.

The image processing apparatus 270 classifies scenes of an input image, and defines the size of a central part based on a level of wide-angle suitability of the scenes, i.e., the higher the level of wide-angle suitability of the scenes, the larger the size of the central part is. This leads to a scale factor being close to that for full scaling for the scenes with a higher level of wide-angle suitability. With the input image being scaled up in a wide-view image of a scene suitable for wide-angle display, the wide-view image satisfies the intention for wide-angle of a person who captured the image. Accordingly, the wide-view image is with better sense of realism.

Further, the image processing apparatus 270 estimates a level of wide-angle suitability for an input image based on imaging information, e.g., focal length, aperture, distance-measurement information, and lens type, and defines the size of a central part based on the level of wide-angle suitability, i.e., the higher the level of wide-angle suitability, the larger the size of the central part is. This leads to a scale factor being close to that for full scaling with a higher level of wide-angle suitability. With the input image being scaled up in a wide-view image as is with a high level of wide-angle suitability, the resulting wide-view image satisfies the intention for wide-angle of a person who captured the image. Accordingly, the wide-view image is with better sense of realism.

Moreover, the image processing apparatus with the application of an embodiment of the present disclosure defines the size of a central part in such a manner that a part allowing perception of the entire composition of an input image is included in a central field of view. Accordingly, when the input image is in the centered composition, this leads to a scale factor of full scaling, and when the input image is not in the centered composition, i.e., in the composition of the rule of thirds or in the composition of the diagonal method, this leads to the scale factor basically lower than that for full scaling.

As such, when the input image is in the centered composition, i.e., when the intention of a person who captured the image lies in positioning a viewer's line of sight at the center of the image, the input image is entirely scaled up to be a wide-view image, so that the viewer positions his line of sight at the center thereof.

When the input image is not in the centered composition, i.e., when the intention of a person who captured the image lies in moving a viewer's line of sight from the center of the image, a part allowing perception of the entire composition is positioned within a central field of view in a wide-view image. Therefore, the viewer understands the entire composition, and may move his/her line of sight from the center of the wide-view image. In this sense, the image processing apparatus generates a wide-view image satisfying the intention of a person who captured the image, so that the sense of realism is accordingly improved.

Further, the image processing apparatus with the application of the embodiment of the present disclosure defines a central part so as to include an object(s) in real size based on meta information of an input image indicating the real size of the object(s). This leads to a scale factor basically lower than that for full scaling. With the resulting wide-view image including the object(s) in real size, a viewer may feel like the object(s) are actually in front of him/her. That is, the wide-view image is with better sense of realism and realistic effects.

Still further, when an input image is a letterboxed or pillarboxed image, the image processing apparatus with the application of the embodiment of the present disclosure defines a central part by deleting black bars on the upper and lower or on the right and left portions of the input image, and by using the remaining black-bar-deleted image as the input image. In this manner, because the input image in use is an image of the effective part not including the black bars, the scaling processing is not performed on the black bars, so that the effective part is with better viewability.

Still further, when an input image includes sidebars, and when the sidebars include characters, the image processing apparatus with the application of the present disclosure defines a central part so as to include the entire image within a central field of view. When the sidebars are artificial images, the image processing apparatus defines a central part in such a manner that the remaining part of the image without the sidebars comes within the central field of view. This leads to a scale factor basically lower than that for full scaling.

As such, when sidebars include characters, an input image including the sidebars is positioned entirely within a central field of view as an effective part, and when the sidebars are artificial images, the remaining part of the input image without the sidebars is positioned within the central field of view as the effective part. The effective part is thus with better viewability.

Still further, based on a motion vector in decoding information of an MPEG stream in an input image, the image processing apparatus with the application of the embodiment of the present disclosure estimates how the input image is captured, i.e., with the panning or zoom-in technique. When estimating that the input image is captured with the panning technique, the image processing apparatus moves the position of a central part in the input image in accordance with the motion vector. On the other hand, when estimating that the input image is captured with the zoom-in technique, the image processing apparatus defines a central part in the input image without changing the size of an object. In this case, a peripheral part may be reduced in brightness by degree or may be more blurred.

Accordingly, when the input image is captured with the panning technique, this leads to a scale factor basically lower than that for full scaling, and when the input image is captured with the zoom-in technique, the scale factor is reduced by degrees.

When the input image is captured with the panning technique, i.e., when a person who captures images follows the movement of an object for imaging, a central part in the resulting wide-view image is similarly moved, so that a viewer's line of sight is also moved in accordance with the movement of the object.

When the input image is captured with the zoom-in technique, i.e., when a person who captures images stares at an object for imaging, in the resulting wide-view image, the size of the object remains the same in a central part but a peripheral part is reduced in brightness (or is more blurred), so that a viewer's viewing angle is narrowed. The viewer thus feels like staring at the object. As a result, the wide-view image satisfies the intention of the person who captured the image, thereby improving the sense of realism.

Also based on the motion vector in the decoding information of the MPEG stream in the input image, the image processing apparatus with the application of the embodiment of the present disclosure may define a central part, i.e., the larger the motion vector, the smaller the central part is. In this case, the larger the motion vector, the lower a scale factor becomes compared with that for full scaling. This accordingly prevents the motion vector from becoming too large in the resulting wide-view image even if the input image is scaled up, so that a viewer is protected from visually induced motion sickness. This accordingly improves the viewability of the wide-view image.

Fourth Embodiment

Description of Computer with Application Embodiment of Present Disclosure

The series of processes described above may be performed by hardware or software. For the software to perform the series of processes described above, a program in the software is installed on a computer. Herein, the computer includes a computer in a hardware specifically designed therefor, or a general-purpose personal computer that may perform various functions by installation of various programs, for example.

Figure 47:
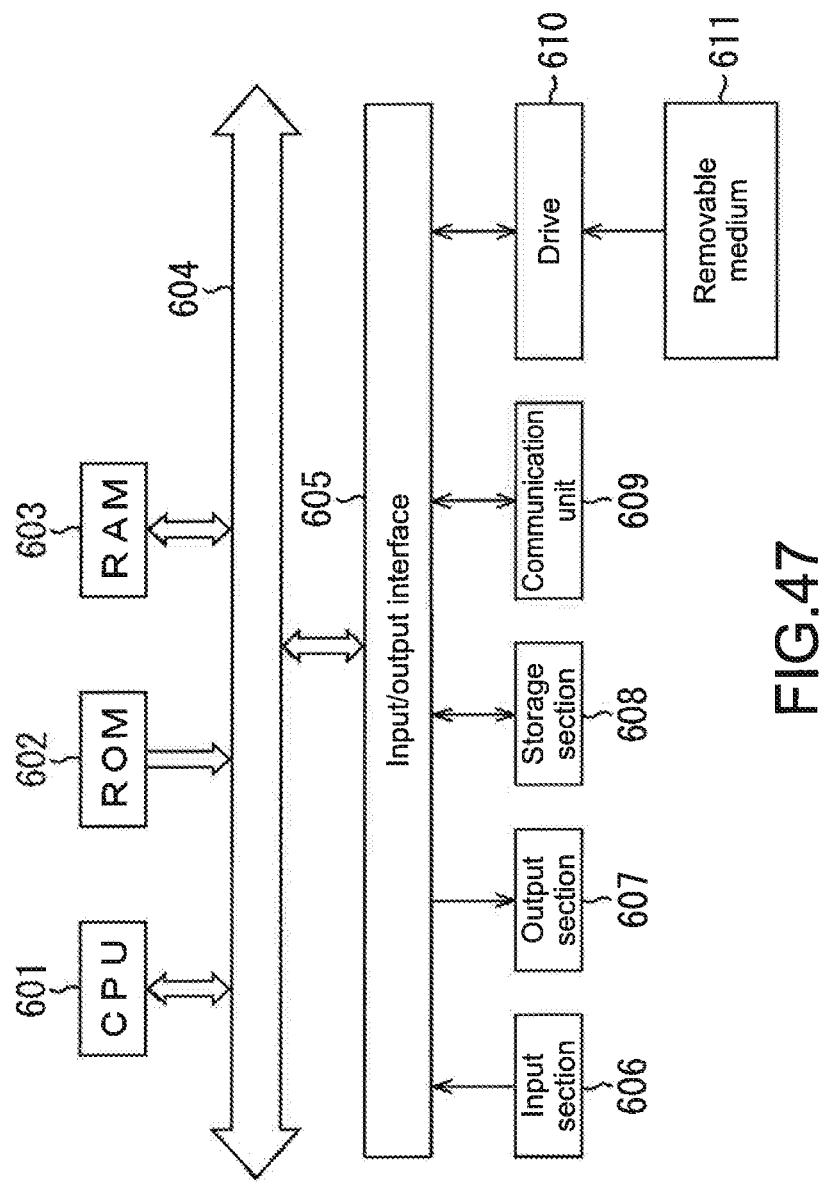
FIG. 47 is a block diagram showing an exemplary hardware configuration of a computer.

FIG. 47 is a block diagram showing an exemplary hardware configuration of a computer that performs the series of processes described above by running a program.

In the computer, a bus 604 connects together a CPU (Central Processing Unit) 601, a ROM (Read Only Memory) 602, and a RAM (Random Access Memory) 603.

The bus 604 is also connected with an input/output interface 605. The input/output interface 605 is connected with an input section 606, an output section 607, a storage section 608, a communication unit 609, and a drive 610.

The input section 606 includes a keyboard, a mouse, a microphone, and others, and the output section 607 includes a display, a speaker, and others. The storage section 608 is a hard disk, or a nonvolatile memory, for example. The communication unit 609 is a network interface, for example. The drive 610 drives a removable medium 611 exemplified by a magnetic disk, an optical disk, a magneto-optical disk, a semiconductor memory, and others.

With the computer in the above configuration, the series of processes described above are performed by the CPU 601 loading the program in the storage section 608 onto the RAM 603 via the input/output interface 605 and the bus 604, for example.

The program to be run by the computer (CPU 601) may be recorded on the removable medium 611 as a package medium or others for distribution. The program may be provided via a wired or wireless transmission medium including a local area network, the Internet, digital satellite broadcasting, and others.

With the computer, the program may be installed on the storage section 608 via the input/output interface 605 by mounting the removable medium 611 on the drive 610. The program may be installed on the storage section 608 by being received by the communication unit 609 via a wired or wireless transmission medium. The program may be also installed in advance on the ROM 602 or the storage section 608.

Note that, with the program to be run by the computer, processes may be performed in a time series manner in the described order, or in a parallel manner or anytime in response to a call.

The foregoing description of the embodiments of the present disclosure is in all aspects illustrative and not restrictive. It is understood that numerous other modifications and variations may be devised without departing from the scope of the present disclosure.

For example, the present disclosure is applicable to cloud computing with which a plurality of apparatuses are connected through a network for processing by sharing and collaboration of a function.

The steps in the flowcharts described above may be performed by one apparatus or by a plurality of apparatuses by sharing.

When one step includes various types of processing, the various types of processing in the step may be performed by one apparatus or by a plurality of apparatuses by sharing.

The present disclosure is applicable not only to an image processing apparatus with which the resolution of an input image is increased but also to an image processing apparatus with which input and output images have the same resolution. Also in this case, the output image to be generated is appropriate to characteristics of the input image.

On the other hand, assuming that an input image is simply an output image, when a viewing angle intended by a person who captured the image is wider than the actual viewing angle, a viewer may view a wide-angle image at the narrower viewing angle. As a result, an object looks excessively small, and in any image expected to be spacious such as landscape, the sense of realism is impaired.

On the other hand, when a viewing angle intended by a person who captured the image is narrower than the actual viewing angle, a viewer may view a narrow-angle telescopic image at the wider viewing angle. Therefore, the viewability of the image is very likely to be impaired because an object(s) may exist beyond a central field of view due to excessive size increase thereof, or because subtitles may exist beyond the central field of view. Moreover, the poor image quality is easily noticeable in the image.

The present technology may be also in the following structures.

(1) An image processing apparatus, including:
a center generation section configured to generate an image of a central part on a screen by performing scaling processing on an image based on characteristics thereof;
a periphery generation section configured to generate an image of a peripheral part by extrapolation of the image of the central part, the peripheral part being a part peripheral to the central part on the screen; and
an image combination section configured to generate a combined image by combining the image of the central part and the image of the peripheral part, the image of the central part being generated by the center generation section, the image of the peripheral part being generated by the periphery generation section.

(2) The image processing apparatus according to (1), further including
a detection section configured to detect a predetermined part in the image, in which
the center generation section performs the scaling processing on the image to include the predetermined part within a central field of view of the combined image, the predetermined part being detected by the detection section.

(3) The image processing apparatus according to (2), in which
the detection section detects a part of subtitles in the image, and
the center generation section performs the scaling processing on the image to include the subtitle part within the central field of view of the combined image, the subtitle part being detected by the detection section.

(4) The image processing apparatus according to (2) or (3), in which
the detection section detects a part of a face in the image, and
the center generation section performs the scaling processing on the image to include the face part within the central field of view of the combined image, the face part being detected by the detection section.

(5) The image processing apparatus according to (4), in which
the center generation section generates the image of the central part by performing the scaling processing on the image to include the face part within the central field of view of the combined image, and positions the image of the central part on the screen to include the face part in the image of the central part at a center of the central field of view.

(6) The image processing apparatus according to any of (2) to (5), in which
the detection section detects a part of an object in the image, and
the center generation section performs the scaling processing on the image to include the object part within the central field of view of the combined image, the face part being detected by the detection section.

(7) The image processing apparatus according to any of (2) to (6), in which
the detection section detects a part of a human in the image, and
the center generation section performs the scaling processing on the image to include the human part within the central field of view of the combined image, the human part being detected by the detection section.

(8) The image processing apparatus according to any of (2) to (7), in which
the detection section detects a part with a high level of significance in the image based on program genre information thereof, and
the center generation section performs the scaling processing on the image to include the high-significance-level part within the central field of view of the combined image, the high-significance-level part being detected by the detection section.

(9) The image processing apparatus according to (1), further including
a determination section configured to determine the central part based on a quality of the image, in which
the center generation section performs the scaling processing on the image to change a size of the image to a size of the central part determined by the determination section.

(10) The image processing apparatus according to (9), in which
the determination section determines the central part based on a band distribution of the image.

(11) The image processing apparatus according to (9) or (10), in which
the determination section determines the central part based on an amount of compressive strain of the image.

(12) The image processing apparatus according to any of (9) to (11), in which
the determination section determines the central part based on an amount of noise of the image.

(13) The image processing apparatus according to (1), further including
a determination section configured to determine the central part based on a level of wide-angle suitability appropriate to a scene of the image, the level of wide-angle suitability being a level indicating how suitable a scene is for wide-angle display of the image, in which
the center generation section performs the scaling processing on the image to change a size of the image to a size of the central part determined by the determination section.

(14) The image processing apparatus according to (1), in which when the image is captured with a panning technique, based on a motion vector of the image, the center generation section positions the central part on the screen.

(15) The image processing apparatus according to (1), in which when the image is captured with a zoom-in technique, the center generation section performs the scaling processing on the image not to change a size of an object therein with a passage of time, and the periphery generation section changes a level of intensity or blurriness in the image of the peripheral part during the passage of time.

(16) The image processing apparatus according to (1), further including a determination section configured to determine the central part based on a motion vector of the image, in which the center generation section performs the scaling processing on the image to change a size of the image to a size of the central part determined by the determination section.

(17) The image processing apparatus according to (1), further including a determination section configured to determine the central part based on a level of wide-angle suitability appropriate to imaging information of the image, the level of wide-angle suitability being a level indicating how suitable the image is for wide-angle display, in which the center generation section performs the scaling processing on the image to change a size of the image to a size of the central part determined by the determination section.

(18) The image processing apparatus according to (1), in which when the image includes a black bar, the center generation section performs the scaling processing on the image based on the characteristics of the image after the black bar is deleted.

(19) The image processing apparatus according to (1), in which based on a real size of an object in the image, the center generation section performs the scaling processing on the image to change a size of the object in the image of the central part to the real size of the object.

(20) An image processing method, including:

by an image processing apparatus, generating an image of a central part on a screen by scaling processing performed on an image based on characteristics thereof;

generating an image of a peripheral part by extrapolation of the image of the central part, the peripheral part being a part peripheral to the central part on the screen; and generating a combined image by combining the image of the central part generated in the generating and the image of the peripheral part generated in the generating.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    a determination section configured to
        determine a size of a central part on a screen based on an amount of noise of an image, wherein the amount of noise of the image is measured based on information about a camera used to capture the image;
    a center generation section configured to generate a central image being an image of the central part by performing scaling processing on the image, based on characteristics of the image, to change a size of the image to the size of the central part determined by the determination section;
    a periphery generation section configured to generate a peripheral image by extrapolation of the central image, the peripheral image being a part that is peripheral to the central image and partially overlapping the central image; and
    an image combination section configured to generate a combined image by combining the central image and the peripheral image, the central image being generated by the center generation section, the peripheral image being generated by the periphery generation section,
    wherein the determination section, the center generation section, the periphery generation section, and the image combination section are each implemented via at least one processor.

2. The image processing apparatus according to claim 1, further comprising
    a detection section configured to detect a predetermined part in the image, wherein
    the center generation section performs the scaling processing on the image to include the predetermined part within a central field of view of the combined image, the predetermined part being detected by the detection section, and
    the detection section is implemented via at least one processor.

3. The image processing apparatus according to claim 2, wherein
    the detection section detects a part of subtitles in the image, and
    the center generation section performs the scaling processing on the image to include the subtitles part within the central field of view of the combined image, the subtitles part being detected by the detection section.

4. The image processing apparatus according to claim 2, wherein
    the detection section detects a part of a face in the image, and
    the center generation section performs the scaling processing on the image to include the face part within the central field of view of the combined image, the face part being detected by the detection section.

5. The image processing apparatus according to claim 4, wherein
    the center generation section generates the central image by performing the scaling processing on the image to include the face part within the central field of view of the combined image, and positions the central image on the screen to include the face part in the central image at a center of the central field of view.

6. The image processing apparatus according to claim 2, wherein
    the detection section detects a part of an object in the image, and
    the center generation section performs the scaling processing on the image to include the object part within the central field of view of the combined image, the object part being detected by the detection section.

7. The image processing apparatus according to claim 2, wherein
    the detection section detects a part of a human in the image, and the center generation section performs the scaling processing on the image to include the human part within the central field of view of the combined image, the human part being detected by the detection section.

8. The image processing apparatus according to claim 2, wherein the detection section detects a part with a high level of significance in the image based on program genre information thereof, and the center generation section performs the scaling processing on the image to include the high-significance-level part within the central field of view of the combined image, the high-significance-level part being detected by the detection section.

9. The image processing apparatus according to claim 1, wherein the determination section is further configured to determine a ratio of the central part to the screen based on the amount of noise of the image.

10. The image processing apparatus according to claim 9, wherein the characteristics of the image include a scale factor based on the ratio of the central part to the screen.

11. The image processing apparatus according to claim 10, wherein when the scale factor is larger than 1, the scaling processing to be performed includes scale-up processing.

12. The image processing apparatus according to claim 1, wherein the determination section is further configured to determine the size of the central part based on a band distribution of the image.

13. The image processing apparatus according to claim 1, wherein the determination section is further configured to determine the size of the central part based on an amount of compressive strain of the image.

14. The image processing apparatus according to claim 1, wherein the determination section is further configured to determine the size of the central part based on a level of wide-angle suitability appropriate to a scene of the image, the level of wide-angle suitability being a level indicating how suitable a scene is for wide-angle display of the image, and wherein the center generation section performs the scaling processing on the image to change the size of the image to the size of the central part determined by the determination section.

15. The image processing apparatus according to claim 1, wherein when the image is captured with a panning technique, based on a motion vector of the image, the center generation section positions the central part on the screen.

16. The image processing apparatus according to claim 1, wherein when the image is captured with a zoom-in technique, the center generation section performs the scaling processing on the image not to change a size of an object therein with a passage of time, and the periphery generation section changes a level of intensity or blurriness in the image of the peripheral part during the passage of time.

17. The image processing apparatus according to claim 1, wherein the determination section is further configured to determine the size of the central part based on a motion vector of the image, and wherein the center generation section performs the scaling processing on the image to change the size of the image to the size of the central part determined by the determination section.

18. The image processing apparatus according to claim 1, wherein the determination section is further configured to determine the size of the central part based on a level of wide-angle suitability appropriate to imaging information of the image, the level of wide-angle suitability being a level indicating how suitable the image is for wide-angle display, and wherein the center generation section performs the scaling processing on the image to change the size of the image to the size of the central part determined by the determination section.

19. The image processing apparatus according to claim 1, wherein when the image includes a black bar, the center generation section performs the scaling processing on the image based on the characteristics of the image after the black bar is deleted.

20. The image processing apparatus according to claim 1, wherein based on a real size of an object in the image, the center generation section performs the scaling processing on the image to change a size of the object in the image of the central part to the real size of the object.

21. The image processing apparatus according to claim 1, wherein the extrapolation comprises setting a value of an outermost pixel in the peripheral image to be same as a pixel in the central image closest to a boundary with the peripheral image, and setting a value of a pixel in the peripheral image next to the outermost pixel to be same as a pixel in the central image second closest to the boundary with the peripheral image.

22. The image processing apparatus according to claim 1, wherein the characteristics of the image further includes a size of the image in a vertical direction.

23. An image processing method, comprising:
by an image processing apparatus,
determining a size of a central part on a screen based on an amount of noise of an image, wherein the amount of noise of the image is measured based on information about a camera used to capture the image;
generating a central image being an image of the central part by scaling processing performed on the image, based on characteristics of the image, to change a size of the image to the determined size of the central part;
generating a peripheral image by extrapolation of the central image, the peripheral image being a part that is peripheral to the central image and partially overlapping the central image; and
generating a combined image by combining the central image and the peripheral image,
wherein the characteristics of the image include a scale factor based on a ratio of the central part to the screen.

24. A non-transitory computer-readable medium having embodied thereon a program, which when executed by a computer causes the computer to execute a method, the method comprising:
determining a size of a central part on a screen based on an amount of noise of an image, wherein the amount of noise of the image is measured based on information about a camera used to capture the image;
generating a central image being an image of the central part by scaling processing performed on the image, based on characteristics of the image, to change a size of the image to the determined size of the central part;

generating a peripheral image by extrapolation of the central image, the peripheral image being a part that is peripheral to the central image and partially overlapping the central image; and generating a combined image by combining the central image and the peripheral image, wherein the characteristics of the image include a scale factor based on a ratio of the central part to the screen.

* * * * *